(12) United States Patent
Lee

(10) Patent No.: US 9,990,034 B2
(45) Date of Patent: Jun. 5, 2018

(54) TRANSPARENT DISPLAY DEVICE AND CONTROL METHOD THEREFOR

(71) Applicant: LG ELECTRONICS INC., Seoul (KR)

(72) Inventor: Gunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 15/036,772

(22) PCT Filed: Nov. 15, 2013

(86) PCT No.: PCT/KR2013/010383
§ 371 (c)(1),
(2) Date: May 13, 2016

(87) PCT Pub. No.: WO2015/072604
PCT Pub. Date: May 21, 2015

(65) Prior Publication Data
US 2016/0291691 A1    Oct. 6, 2016

(51) Int. Cl.
*G09G 5/12* (2006.01)
*G06F 3/01* (2006.01)
*G06F 3/14* (2006.01)
*G09G 3/00* (2006.01)
*G06F 3/03* (2006.01)
(Continued)

(52) U.S. Cl.
CPC .............. *G06F 3/013* (2013.01); *G06F 3/017* (2013.01); *G06F 3/0304* (2013.01); *G06F 3/0481* (2013.01); *G06F 3/14* (2013.01); *G06F 3/1423* (2013.01); *G06T 19/006* (2013.01); *G09G 3/003* (2013.01)

(58) Field of Classification Search
CPC ........................................................ G06F 3/013
USPC ........................................................ 345/632
See application file for complete search history.

(56) References Cited

U.S. PATENT DOCUMENTS

| 8,330,811 B2 * | 12/2012 | Macguire, Jr. .......... G06F 3/011 345/632 |
| 2002/0097247 A1 * | 7/2002 | Ohba ...................... G06F 3/011 345/501 |

(Continued)

FOREIGN PATENT DOCUMENTS

| JP | 2000-146 | 1/2000 |
| KR | 10-2011-0136012 | 12/2011 |

(Continued)

OTHER PUBLICATIONS

PCT International Application No. PCT/KR2013/010383, Notification of Transmittal of the International Search Report dated Sep. 17, 2014, 3 pages.

*Primary Examiner* — Javid A Amini
(74) *Attorney, Agent, or Firm* — Lee, Hong, Degerman, Kang & Waimey

(57) ABSTRACT

Disclosed is a transparent display device. A transparent display device according to one embodiment displays a predetermined image through a transparent display panel and senses the direction of the line of sight of a person gazing at the transparent display panel, thereby displaying detailed information of an object on the transparent display panel if the line of sight of the person is directed toward the object positioned on the rear surface of the transparent display panel.

24 Claims, 23 Drawing Sheets

(51) Int. Cl.
   *G06F 3/0481*   (2013.01)
   *G06T 19/00*    (2011.01)

(56) References Cited

U.S. PATENT DOCUMENTS

| | | | | |
|---|---|---|---|---|
| 2009/0060291 | A1* | 3/2009 | Ohtani | G06K 9/00281 |
| | | | | 382/118 |
| 2011/0128223 | A1* | 6/2011 | Lashina | G06F 3/013 |
| | | | | 345/158 |
| 2013/0050432 | A1* | 2/2013 | Perez | H04N 13/0278 |
| | | | | 348/47 |
| 2013/0051612 | A1* | 2/2013 | Prokhorov | G06K 9/00765 |
| | | | | 382/103 |
| 2013/0155309 | A1* | 6/2013 | Hill | H04N 5/23212 |
| | | | | 348/333.11 |
| 2013/0189649 | A1* | 7/2013 | Mannino | G09B 9/052 |
| | | | | 434/65 |
| 2013/0265232 | A1* | 10/2013 | Yun | G09G 3/3208 |
| | | | | 345/158 |
| 2016/0027329 | A1* | 1/2016 | Jerauld | G06F 1/163 |
| | | | | 434/127 |

FOREIGN PATENT DOCUMENTS

| | | |
|---|---|---|
| KR | 10-2012-0029228 | 3/2012 |
| KR | 10-2012-0029230 | 3/2012 |
| KR | 10-2012-0104475 | 9/2012 |

\* cited by examiner

TRANSPARENT DISPLAY DEVICE AND CONTROL METHOD THEREFOR

CROSS-REFERENCE TO RELATED APPLICATIONS

This application is the National Stage filing under 35 U.S.C. 371 of International Application No. PCT/KR2013/010383, filed on Nov. 15, 2013, the contents of which are all hereby incorporated by reference herein in their entirety.

TECHNICAL FIELD

The present invention is related to a transparent display device and a method for controlling the device.

BACKGROUND ART

Display devices are evolving in various ways to meet consumer needs. As one example, recently being developed are transparent display devices which provide a display function while allowing a person to see through the display as if seeing through glass. Since a transparent display device is based on a see-through display, the person, being located in the rear surface of the transparent display device, can still see objects or a scene occluded by the transparent display device.

For example, a transparent display device can be implemented as described below. In case a transparent display device is installed as a show window of a shop, people can see the products of the shop through the transparent display device but also see the information of the products displayed on the transparent display device. Similarly, in case a transparent display device is implemented in the form of a digital signage which displays digital information, people can see various kinds of digital information displayed on the transparent display device while still being able to see objects or a scene through the transparent display device.

In particular, in the case of the example above, if a transparent display device can be controlled by the person's gaze directed toward the transparent display device, utilization of the transparent display device can be greatly enhanced.

DISCLOSURE

Technical Problem

The present invention provides a transparent display device detecting gaze direction of a person toward the transparent display device and controlling the transparent display device according to the gaze direction of the person; and a method for controlling the device.

Technical Solution

A transparent display device according to an embodiment of the present invention comprises a first transparent display panel not only being implemented by a see-through display but also displaying an image thereon; a first gaze detection sensor detecting gaze of a person looking at the first transparent display panel; and a controller analyzing the gaze of the person and if the gaze of the person is directed toward an object located on the rear surface of the first transparent display panel, displaying detailed information of the object on the first transparent display panel.

In a method for controlling a transparent display device equipped with a first transparent display panel not only being implemented by a see-through display but also displaying an image thereon, a method for controlling a transparent display device according to an embodiment of the present invention comprises detecting a gaze direction of a person looking at the first transparent display panel by using the first gaze detection sensor; and analyzing the gaze direction of the person and if the gaze of the person is directed toward an object located on the rear surface of the first transparent display panel, displaying detailed information of the object on the first transparent display panel.

Advantageous Effects

The present invention determines whether a person's gaze is directed to an object and displays an indicator or detailed information of the object on a transparent display panel according to the determination. As a result, the present invention can provide detailed information of the object for the person looking at the object by using a transparent display device. Therefore, the present invention can improve the person's satisfaction by using a transparent display device.

MODE FOR INVENTION

In what follows, preferred embodiment of the present invention will be described in detail with reference to appended drawings. Throughout the document, the same reference numbers denote actually the same constituting elements. In what follows, in case specific descriptions of functions or structures known to the public related to the present invention are determined to obscure the technical principles of the present invention, the detailed descriptions will be omitted. The terms for constituting elements used in the descriptions below have been chosen only for the purpose of convenience of documenting the invention; thus, the terms can be different from those for actual products.

Figure 1:
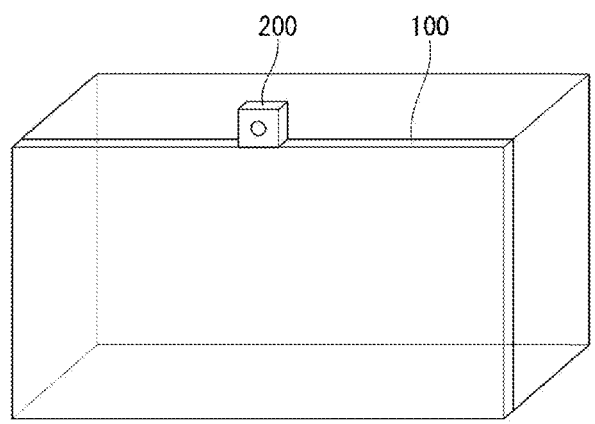
FIG. 1 is a perspective view of a transparent display device according to an embodiment of the present invention.
Figure 2:
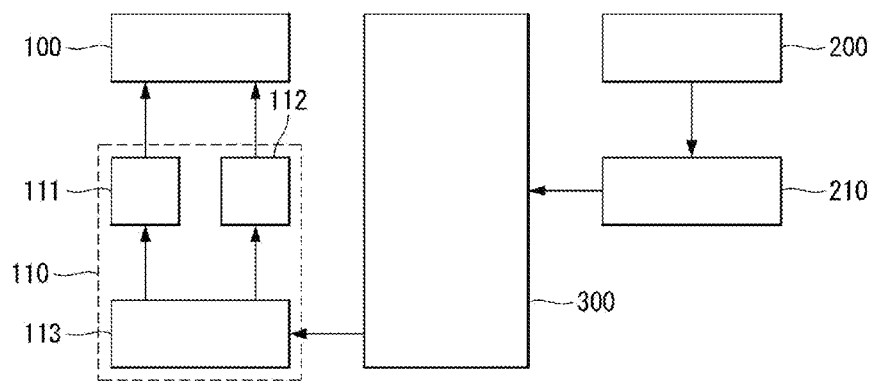
FIG. 2 is a block diagram of the transparent display device of FIG. 1.

FIG. 1 is a perspective view of a transparent display device according to an embodiment of the present invention. FIG. 2 is a block diagram of the transparent display device of FIG. 1. With reference to FIGS. 1 and 2, a transparent display device according to an embodiment of the present invention comprises a first transparent display panel 100, first transparent display panel driver 110, first gaze detection sensor 200, gaze direction determining unit 210, and controller 300.

The first transparent display panel 100 can be implemented by a flat panel display element such as Liquid Crystal Display (LCD) or Organic Light Emitting Diode (OLED). Although the present invention is described under the assumption that the first transparent display panel 100 is implemented by liquid crystal display (LCD) in the embodiment below, it should be noted that the present invention is not limited to the aforementioned assumption.

The first transparent display panel 100 includes a liquid crystal layer formed between two glass substrates. On a lower glass substrate of the first transparent display panel 100, a plurality of data lines and a plurality of gate lines are formed being crossed with each other. In the cell regions defined by the cross structure of data lines and gate lines, disposed are liquid crystal cells in a matrix form. Also, on the lower glass substrate of the first transparent display panel 100, Thin Film Transistor (TFT), pixel electrodes of liquid crystal cells connected to the TFT, storage capacitor, and so on are formed. Thin film transistor provides data voltage of a data line to the pixel electrode of the liquid crystal cell in response to a gate pulse of the gate line. Liquid crystal cells, being driven by the electric field generated by voltage difference between the data voltage provided to the pixel electrode and a common voltage provided to a common electrode, adjust the amount of light penetrating the first transparent display panel 100.

On the upper glass substrate of the first transparent display panel 100, formed are a black matrix, color filter, and common electrode. The common electrode is formed on the upper glass substrate in the case of vertical electric field driving structure such as Twisted Nematic (TN) mode and Vertical Alignment (VA) mode. In the case of horizontal electric field driving structure such as In Plane Switching (IPS) mode and Fringe Field Switching (FFS), the common electrode is formed on the lower glass substrate together with pixel electrodes. On the upper glass substrate of the first transparent display panel 100, an upper polarizing plate is attached, and a lower polarizing plate is attached on the lower glass substrate. The upper polarizing plate and the lower polarizing plate can be disposed being orthogonal to each other. An alignment layer for controlling a pre-tilt angle of liquid crystal is formed on the inner surface facing liquid crystal of the liquid crystal layer.

The first transparent display panel 100, being implemented with a see-through display, is capable of displaying images. More specifically, liquid crystal cells of the first transparent display panel 100 display an image by reproducing black tone, grey tone, and white tone. At this time, backlight should be provided to the first transparent display panel 100. Also, liquid crystal cells of the first transparent display panel 100 can be made transparent by reproducing peak white tone. At this time, backlight is not provided to the first transparent display panel 100. For example, in case an image is displayed only on a part of the first transparent display panel 100 while the remaining area is made transparent, backlight should be supplied only for the partial area whereas backlight should be prevented from being supplied to the other area. Meanwhile, in the 256 tones expressed by 8 bits, the peak black tone is specified by G0, and peak white tone is specified by G255.

The first transparent display panel driver 110 provides a plurality of signals for driving the first transparent display panel 100. The first transparent display panel driver 110 includes a first gate driver 111, first data driver 112, and first timing controller 113. The first data driver 112 can comprise a plurality of data drive integrated circuits. The first data driver 112 converts digital video data to positive polarity/negative polarity analog data voltage by using positive polarity/negative polarity gamma compensation voltage under the control of the first timing controller 113 and provides the analog data voltage to the data lines of the first transparent display panel 100. The first gate driver 110 outputs gate pulses (or scan pulses) sequentially under the control of the first timing controller 113 to select liquid crystal cells to which data voltage is supposed to be supplied and provides the output gate pulses to the gate lines of the first transparent display panel 100.

The first timing controller 113 receives digital video data and timing signals input from the controller 300. Timing signals can include a vertical synchronization signal, horizontal synchronization signal, data enable signal, and dot clock signal. The first timing controller 113 generates timing control signals for controlling operation timing of the first data driver 112 and first gate driver 111 on the basis of digital video data and timing signals. The first timing controller 113 outputs timing control signals to the first data driver 112 and to the first gate driver 111 to control timing of the first data driver 112 and the first gate driver 111.

In case the first transparent display panel 100 is implemented by a liquid crystal display device, the transparent display device further comprises a backlight unit (not shown in the figure) for supplying backlight to the first transparent display panel 100.

The backlight unit (not shown) comprises a light source array and a light guide plate and can be implemented by an edge-type backlight unit. In this case, in the lower part of the first transparent display panel 100, a light guide plate is disposed, and a light source array is disposed on the side surface of the light guide plate. Light sources can be implemented by Light Emitting Diodes (LEDs) which are characterized by advantages such as high efficiency, high brightness, and low power consumption. Light sources are turned on or off by receiving driving currents from the light source driver. The light guide plate converts the light from light sources of the light source array into a surface light source and illuminates the light onto the display panel. The light guide plate is implemented by transparent materials.

The first gaze detection sensor 200 detects the gaze of the person looking at the first transparent display panel 100 in front of the first transparent display panel 100. The first gaze detection sensor 200 can be disposed on the upper surface of the first transparent display panel 100 as shown in FIG. 1. Also, the first gaze detection sensor 200 can be implemented by a CCD (Charge Coupled Device) camera sensor or a CMOS (Complementary Metal Oxide Semiconductor) camera sensor. In this case, the first gaze detection sensor 200 captures an image of the person looking at the first transparent display panel 100 in front of the first transparent display panel 100, generates image data, and outputs the image data to the gaze direction determination unit 210.

The gaze direction determination unit 210 analyzes image data, calculates position coordinates of a person looking at the first transparent display panel 100, and calculates the gaze direction of the person. The controller 300 determines toward which the person' gaze is directed on the basis of the position coordinates and gaze direction of the person calculated in the gaze direction determination unit 210. The algorithm for detecting in which direction the person's gaze is directed can be implemented by any one of related algorithms well-known to the public.

The controller 300 controls the overall operation of the transparent display device. More specifically, the controller 300 controls the transparent display device according to the gaze direction of the person. In other words, the controller 300 controls the first transparent display panel 100 according to whether the person's gaze is directed to an object. The controller 300 can implement a see-through display on the first transparent display panel 100 or display information on the first transparent display panel 100 by receiving digital image data stored in the memory (not shown) and controlling the input digital image data to be output to the first transparent display panel driver 110. Detailed descriptions about a method for controlling the transparent display device will be described later with reference to FIGS. 3 and 4a to 4c.

Meanwhile, the transparent display device according to an embodiment of the present invention can further comprise a memory (not shown) storing digital image data for implementing a see-through display in the first transparent display panel and digital image data corresponding to the information displayed on the first transparent display panel 100; interface unit (not shown) performing the role of an interface through which the transparent display device is connected to an external device; and power supply unit (not shown) for supplying power required for each constituting element of the transparent display device.

Figure 3:
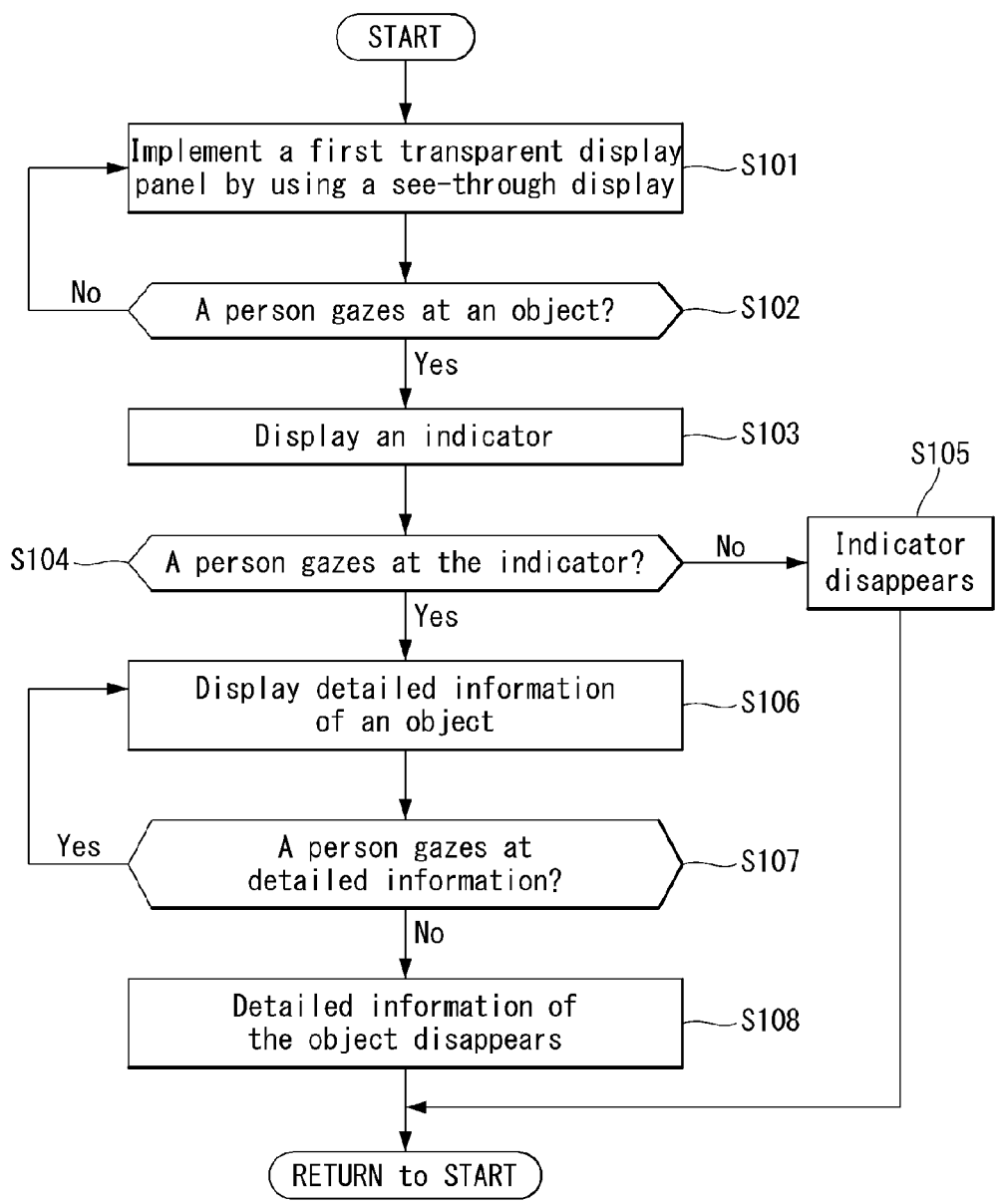
FIG. 3 is a flow diagram illustrating a method for controlling a transparent display device according to a first embodiment of the present invention.
Figure 4A:
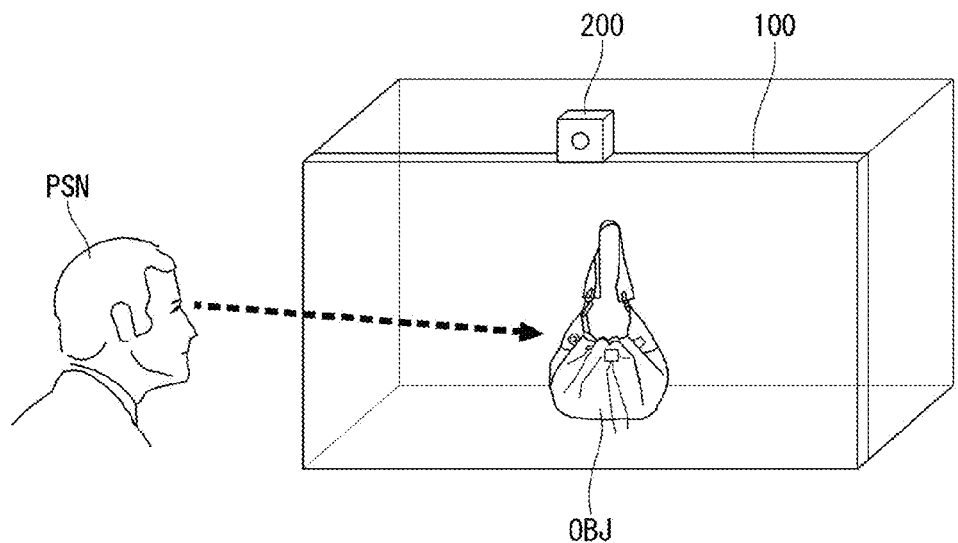
FIGS. 4a to 4c illustrate the transparent display device of FIG. 3 and a person looking at the transparent display device.
Figure 4B:
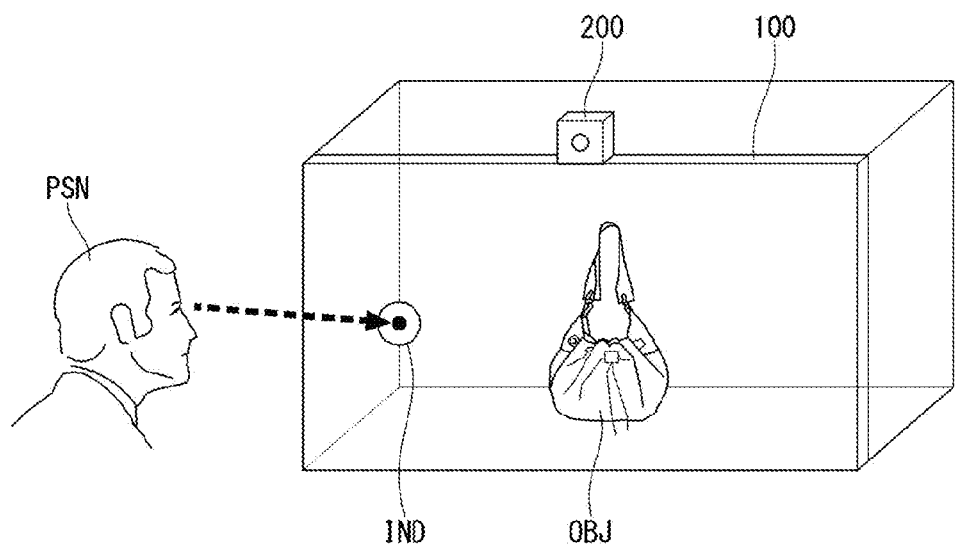
Figure 4C:
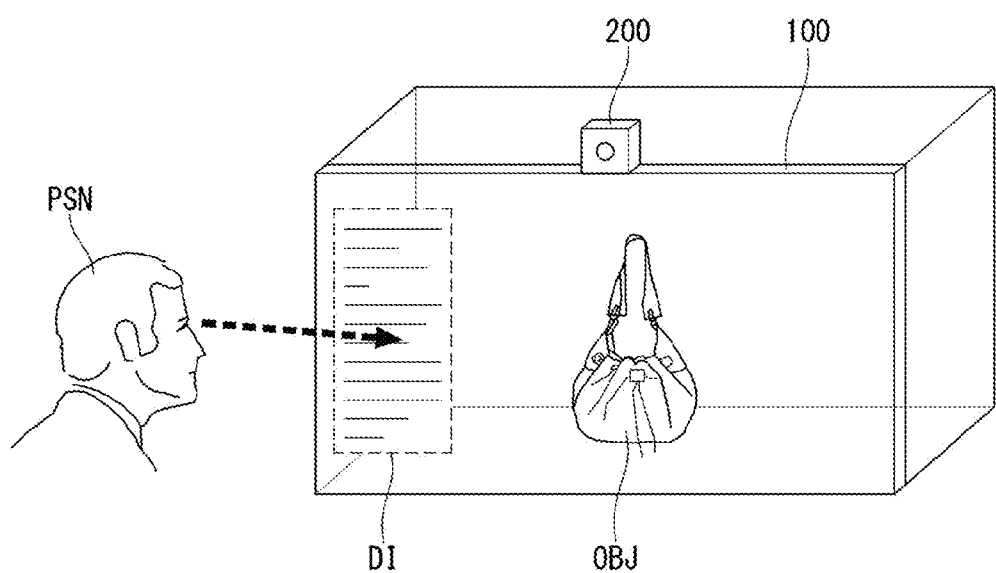

FIG. 3 is a flow diagram illustrating a method for controlling a transparent display device according to a first embodiment of the present invention. FIGS. 4a to 4c illustrate a transparent display device and the person looking at the transparent display device in the case of FIG. 3. FIG. 3 and FIGS. 4a to 4c describe in detail a method for controlling the first transparent display panel 100 in case the gaze of a person looking at the first transparent display panel 100 is directed to an object located on the rear surface of the first transparent display panel 100.

First, the controller 300 transmits digital image data of peak white tone to the first transparent display panel driver 110 so that the first transparent display panel 100 can implement a see-through display. As a result, the first transparent display panel 100 becomes transparent and thus, a person (PSN) looking at the first transparent display panel 100 in front of the first transparent display panel 100 can see the object through the first transparent display panel 100, S101.

Second, the controller 300 determines whether the gaze of the person (PSN) looking at the first transparent display panel 100 is directed to the object. More specifically, the first gaze detection sensor 200 generates image data by capturing an image of the person (PSN) looking at the first transparent display panel 100 in front of the first transparent display panel 100 and outputs image data to the gaze direction determination unit 210. In this case, the gaze direction determination unit 210 calculates position coordinates of the person by analyzing the image data and calculate the gaze direction of the person. The controller 300 can determine whether the person's gaze is directed to the object on the basis of the position coordinates of the person calculated by the gaze direction determination unit 210, gaze direction of the person, and position coordinates of the object pre-stored in the memory. In case the gaze of the person (PSN) looking at the first transparent display panel 100 is not directed to the object, the controller 300 maintains the first transparent display panel 100 to be transparent S102.

Third, in case the gaze of the person (PSN) looking at the first transparent display panel 100 is directed to the object (OBJ) as shown in FIG. 4a, the controller 300 controls the first transparent display panel 100 so that an indicator (IND) about the object OBJ can be displayed on the first transparent display panel 100 as shown in FIG. 4b. The indicator (IND) is an identification mark to draw the person's attention, where FIG. 4b shows a mark of "⊙", but the present invention is not limited to the particular mark. In other words, the indicator (IND) can be implemented in any form such as a circle, triangle, or rectangle.

The indicator (IND) can be displayed at the front of the object (OBJ) on the first transparent display panel 100. Or the display position of the indicator (IND) can be adjusted according to the position of the person (PSN) looking at the object (OBJ). For example, in case the person (PSN) looking at the object (OBJ) is at the left of the object (OBJ) as shown in FIG. 4b, the indicator (IND) can be displayed at the left of the front of the object (OBJ) on the first transparent display panel 100. In this case, the person (PSN) looking at the object (OBJ) can recognize the indicator (IND) more easily S103.

Fourth, the controller 300 determines whether the gaze of the person (PSN) is directed to the indicator (IND). In case the gaze of the person (PSN) is not directed to the indicator for a predetermined time period, the controller 300 controls the indicator (IND) to disappear from the first transparent display panel 100. Also, as shown in FIG. 4b, in case the gaze of the person (PSN) is directed to the indicator (IND), the controller 300 controls the first transparent display panel 100 so that detailed information (DI) of the object can be displayed on the first transparent display panel 100 as shown in FIG. 4c. The detailed information (DI) of the object can include any kind of information once it is intended to express the object (OBJ) with more detail, such as a window including text, image, or video.

The detailed information (DI) of the object can be displayed at the position where the indicator (IND) has been displayed. In other words, the detailed information (DI) of the object can be displayed at the front of the object (OBJ) in the first transparent display panel 100. Also, the display position of the detailed information (DI) of the object can be adjusted according to the position of the person (PSN) looking at the object (OBJ). For example, as shown in FIG. 4c, in case the person (PSN) looking at the object (OBJ) is located at the left of the object (OBJ), the detailed information (DI) of the object can be displayed at the left of the front of the object (OBJ) in the first transparent display panel 100. In this case, the person (PSN) looking at the object (OBJ) can recognize the detailed information (DI) of the object more easily. Similarly, the detailed information (DI) of the object can be displayed across the first transparent display panel 100, S104, S105, S106.

Fifth, the controller 300 determines whether the gaze of the person (PSN) is directed to the detailed information (DI) of the object for a predetermined time period. In case the gaze of the person (PSN) is not directed to the detailed information (DI) of the object, the controller 300 controls the detailed information (DI) of the object to disappear from the first transparent display panel 100. Also, in case the gaze of the person (PSN) is directed to the detailed information (DI) of the object, the controller 300 controls the first transparent display panel 100 to maintain the detailed information (DI) of the object to be displayed on the first transparent display panel 100, S107, S108.

Meanwhile, the S103 to S105 steps can be skipped in the first embodiment of the present invention. In this case, if the gaze of the person (PSN) looking at the first transparent display panel 100 is directed to the object (OBJ), the first embodiment of the present invention can display the detailed information (DI) of the object directly on the first transparent display panel 100 without using the indicator (IND).

As described above, a method for controlling a transparent display device according to the first embodiment of the present invention determines to which the gaze of the person (PSN) is directed among the object (OBJ), indicator (IND), and detailed information (DI) of the object; and accordingly, displays the indicator (IND) or detailed information of the object on a part of the first transparent display panel 100. As a result, the first embodiment of the present invention can provide detailed information about the object (OBJ) to the person (PSN) looking at the object (OBJ) by using the transparent display device. In other words, the first embodiment of the present invention can improve service satisfaction for the person (PSN) by utilizing the transparent display device.

Figure 5:
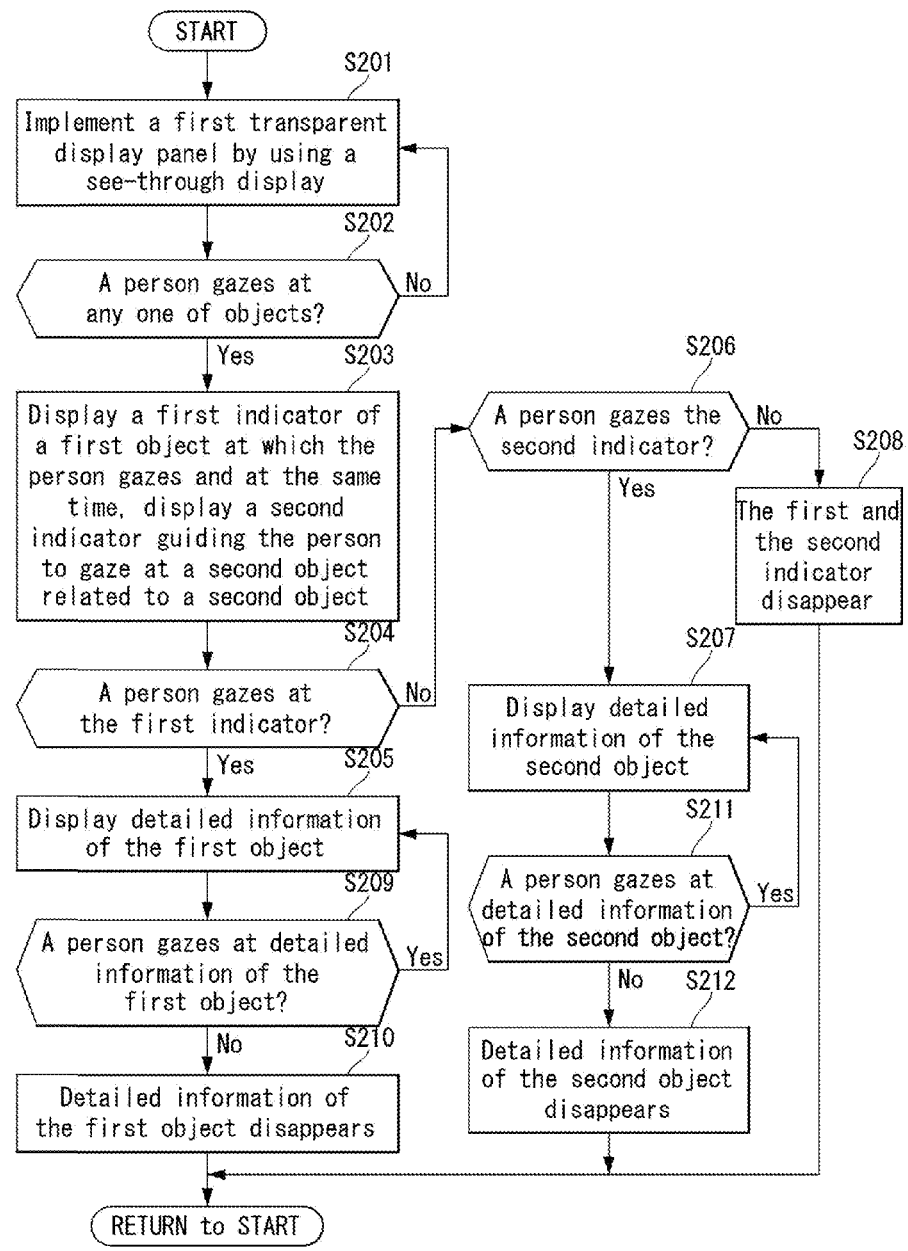
FIG. 5 is a flow diagram illustrating a method for controlling a transparent display device according to a second embodiment of the present invention.

FIG. 5 is a flow diagram illustrating a method for controlling a transparent display device according to a second embodiment of the present invention. FIGS. 6a to 6e illustrate a transparent display device and the person looking at the transparent display device in the case of FIG. 5. FIG. 5 and FIGS. 6a to 6e describe in detail a method for controlling the first transparent display panel 100 in case the gaze of a person looking at the first transparent display panel 100 is directed to one of a plurality of objects located on the rear surface of the first transparent display panel 100. In other words, the second embodiment of the present invention is related to a method for controlling a transparent display device in case a plurality of objects are located on the rear surface of the first transparent display panel 100. FIGS. 6a to 6e assume that two objects are located on the rear surface of the first transparent display panel 100, but it should be noted that the present invention is not limited by the aforementioned assumption. In other words, on the rear surface of the first transparent display panel 100, n objects (where n is a natural number larger than or equal to 2) can be located.

First, the controller 300 transmits digital image data of peak white tone to the first transparent display panel driver 110 so that the first transparent display panel 100 can implement a see-through display. As a result, the first transparent display panel 100 becomes transparent and thus, a person (PSN) looking at the first transparent display panel 100 in front of the first transparent display panel 100 can see a plurality of objects through the first transparent display panel 100, S201.

Second, the controller 300 determines whether the gaze of the person (PSN) looking at the first transparent display panel 100 is directed to one of a plurality of objects. More specifically, the first gaze detection sensor 200 generates image data by capturing an image of the person (PSN) looking at the first transparent display panel 100 in front of the first transparent display panel 100 and outputs image data to the gaze direction determination unit 210. In this case, the gaze direction determination unit 210 calculates position coordinates of the person by analyzing the image data and calculate the gaze direction of the person. The controller 300 can determine whether the person's gaze is directed to any one of a plurality of objects on the basis of the position coordinates of the person calculated by the gaze direction determination unit 210, gaze direction of the person, and position coordinates of each of the plurality of objects pre-stored in the memory. In case the gaze of the person (PSN) looking at the first transparent display panel 100 is not directed to any one of the plurality of objects, the controller 300 maintains the first transparent display panel 100 to be transparent S202.

Figure 6A:
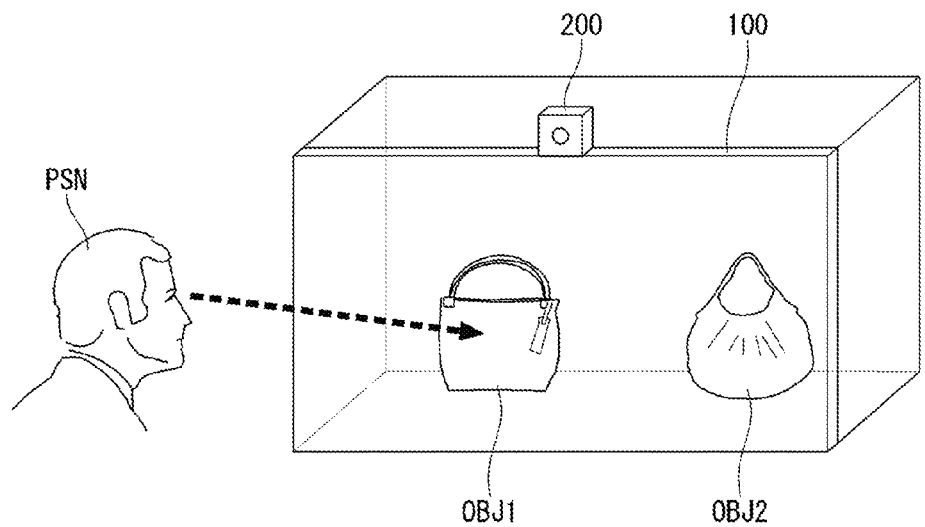
FIGS. 6a to 6e illustrate the transparent display device of FIG. 5 and a person looking at the transparent display device.
Figure 6B:
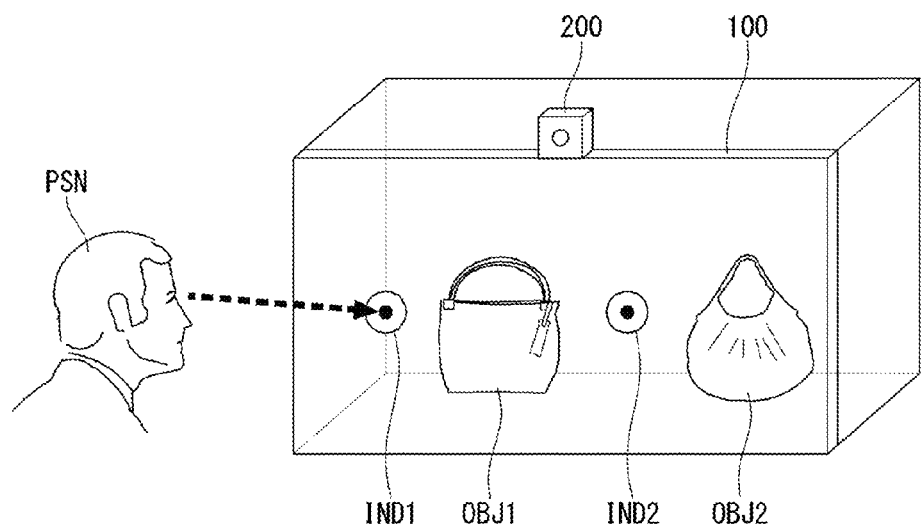

Third, in case the gaze of the person (PSN) looking at the first transparent display panel 100 is directed to a first object (OBJ1) of the plurality of objects as shown in FIG. 6a, the controller 300 controls the first transparent display panel 100 so that a first indicator (IND1) about the first object OBJ1 can be displayed on the first transparent display panel 100 as shown in FIG. 6b. At the same time, the controller 300 controls the first transparent display panel 100 to display a second indicator (IND2) which guides the person to look at the object related to the first object OBJ1. The object related to the first object (OBJ1) can be an object having a form, shape, function, property, quality, or attribute similar to that of the first object (OBJ1). FIG. 6a shows a second object (OBJ2) as the object related to the first object (OBJ1).

The first and second indicator (IND1, IND2) are identification marks to draw the person's attention, where FIG. 6b shows a mark of "⊙", but the present invention is not limited to the particular mark. In other words, the first (IND1) and the second indicator (IND2) can be implemented in any form such as a circle, triangle, or rectangle.

The first indicator (IND1) can be displayed at the front of the first object (OBJ1) on the first transparent display panel 100 while the second indicator (IND2) can be displayed at the front of the second object (OBJ2) on the first transparent display panel 100. Or the display positions of the first (IND1) and the second indicator (IND2) can be adjusted according to the position of the person (PSN) looking at the first (OBJ1) and the second object (OBJ2). For example, in case the person (PSN) looking at the first object (OBJ1) is at the left of the first object (OBJ1) as shown in FIG. 6b, the first indicator (IND1) can be displayed at the left of the front of the first object (OBJ1) on the first transparent display panel 100 while the second indicator (IND2) can be displayed at the left of the front of the second object (OBJ2) on the first transparent display panel 100. In this case, the person (PSN) looking at the first (OBJ1) and the second object (OBJ2) can recognize the first (IND1) and the second indicator (IND2) more easily S203.

Figure 6C:
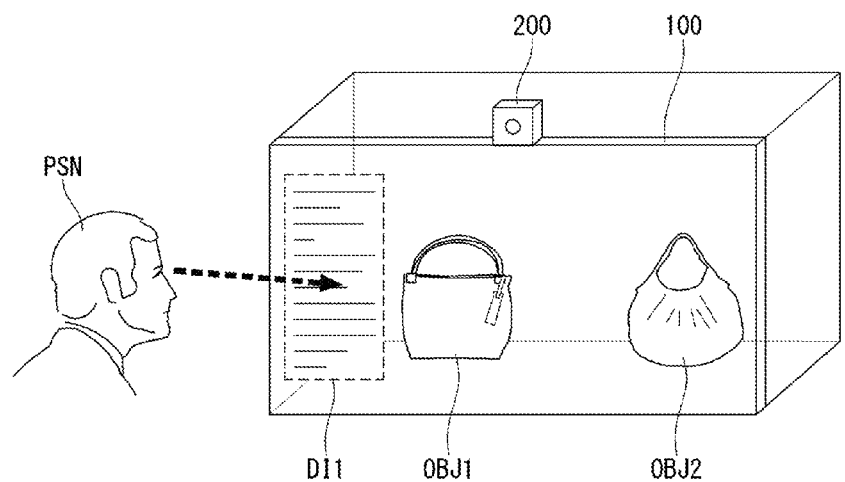
Figure 6D:
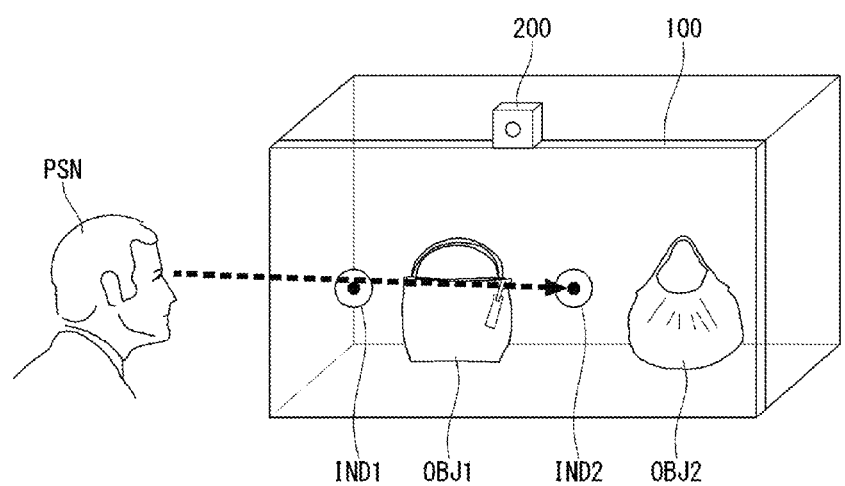
Figure 6E:
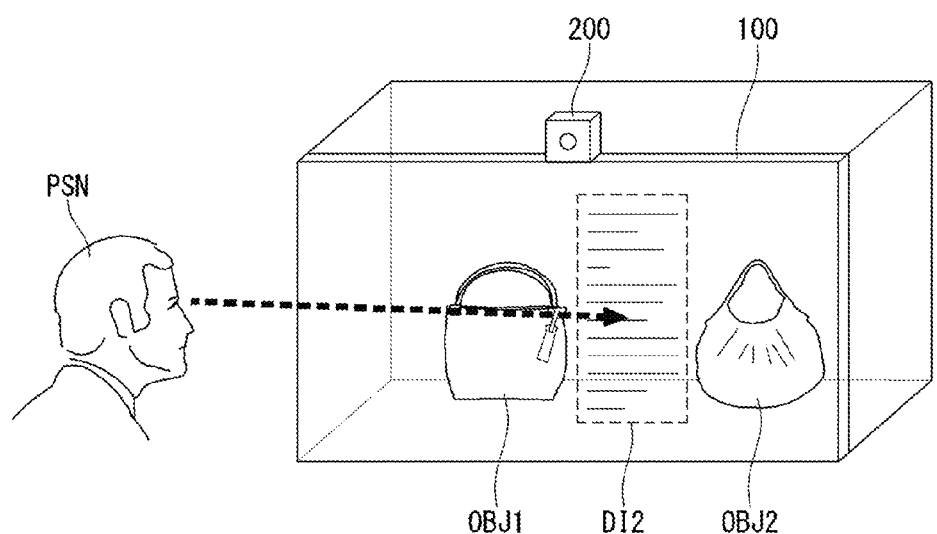

Fourth, the controller 300 determines whether the gaze of the person (PSN) is directed to either of the first (IND1) and the second indicator (IND2). First, the controller 300 determines whether the gaze of the person (PSN) is directed to the first indicator (IND1). In case the gaze of the person (PSN) is directed to the first indicator (IND1) as shown in FIG. 6b, the controller 300 controls the first transparent display panel 100 so that detailed information (DI1) of the first object can be displayed on the first transparent display panel 100 as shown in FIG. 6c. In case the gaze of the person (PSN) is not directed to the first indicator (IND1), the controller 300 determines whether the gaze of the person (PSN) is directed to the second indicator (IND2). In case the gaze of the person (PSN) is directed to the second indicator (IND2) as shown in FIG. 6d, the controller 300 controls the first transparent display panel 100 so that the detailed information (DI2) of the second object can be displayed on the first transparent display panel 100 as shown in FIG. 6e. In case the gaze of the person (PSN) is directed to neither of the first (IND1) and the second indicator (IND2) for a predetermined time period, the controller 300 controls the first (IND1) and the second indicator (IND2) to disappear from the first transparent display panel 100.

The detailed information of the first and the second object (DI1, DI2) can include any kind of information once it is intended to express the object (OBJ) with more detail, such as a window including text, image, or video. The detailed information (DI1) of the first object can be displayed at the position where the first indicator (IND1) has been displayed while the detailed information (DI2) of the second object can be displayed at the position where the second indicator (IND2) has been displayed. For example, the detailed information (DI1) of the first object can be displayed at the front of the first object (OBJ1) in the first transparent display panel 100 while the detailed information (DI2) of the second object can be displayed at the front of the second object (OBJ2) in the first transparent display panel 100. Also, the display positions of the detailed information (DI1) of the first object and the detailed information (DI2) of the second object can be adjusted according to the position of the person (PSN) looking at the first and the second object (OBJ1, OBJ2). For example, as shown in FIG. 6c, in case the person (PSN) looking at the first object (OBJ1) is located at the left of the first object (OBJ1), the detailed information (DI1) of the first object can be displayed at the left of the front of the first object (OBJ1) in the first transparent display panel 100. Also, as shown in FIG. 6e, in case the person (PSN) looking at the second object (OBJ2) is located at the left of the second object (OBJ2), the detailed information (DI2) of the second object can be displayed at the left of the front of the second object (OBJ2) in the first transparent display panel 100. Similarly, the detailed information of the first and the second object (DI1, DI2) can be displayed across the first transparent display panel 100, S204, S205, S206, S207, S208.

The controller 300 determines whether the gaze of the person (PSN) is directed to the detailed information (DI1) of the first object. In case the gaze of the person (PSN) is not directed to the detailed information (DI1) of the first object for a predetermined time period, the controller 300 controls the first transparent display panel 100 so that the detailed information (DI1) of the first object disappears from the first transparent display panel 100. Also, in case the gaze of the person (PSN) is directed to the detailed information (DI1) of the first object, the controller 300 controls the first transparent display panel 100 to maintain the detailed information (DI1) of the first object to be displayed on the first transparent display panel 100, S209, S210.

The controller 300 determines whether the gaze of the person (PSN) is directed to the detailed information (DI2) of the second object. In case the gaze of the person (PSN) is not directed to the detailed information (DI2) of the second object for a predetermined time period, the controller 300 controls the first transparent display panel 100 so that the detailed information (DI2) of the second object disappears from the first transparent display panel 100. Also, in case the gaze of the person (PSN) is directed to the detailed information (DI2) of the second object, the controller 300 controls the first transparent display panel 100 to maintain the detailed information (DI2) of the second object to be displayed on the first transparent display panel 100, S211, S212.

As described above, a method for controlling a transparent display device according to the second embodiment of the present invention determines to which the gaze of the person (PSN) is directed among the first object (OBJ1), second object (OBJ2), first indicator (IND1), second indicator (IND2), detailed information (DI1) of the first object, and detailed information (DI2) of the second object; and accordingly, displays the first indicator (IND1), second indicator (IND2), detailed information (DI1) of the first object, or detailed information (DI2) of the second object on a part of the first transparent display panel 100. As a result, the second embodiment of the present invention can provide detailed information about the object (OBJ) to the person (PSN) looking at the first and/or second object (OBJ1, OBJ2) by using the transparent display device. In other words, the second embodiment of the present invention can improve service satisfaction for the person (PSN) by utilizing the transparent display device.

Figure 7:
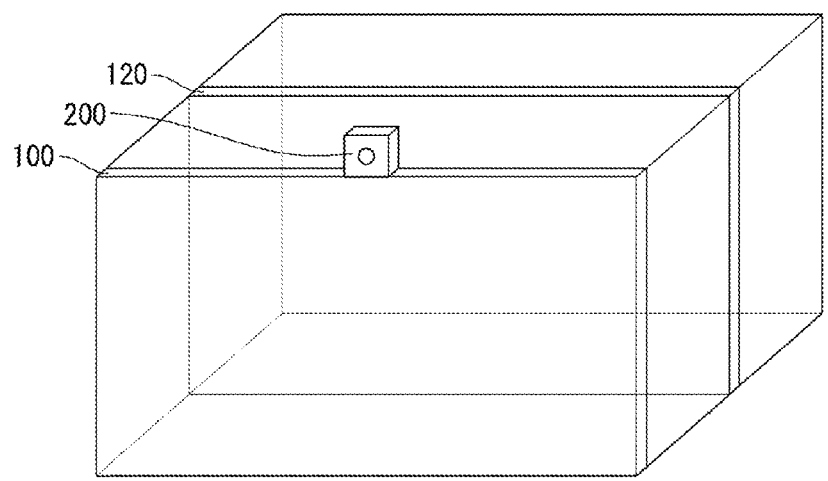
FIG. 7 is a perspective view of a transparent display device according to another embodiment of the present invention.
Figure 8:
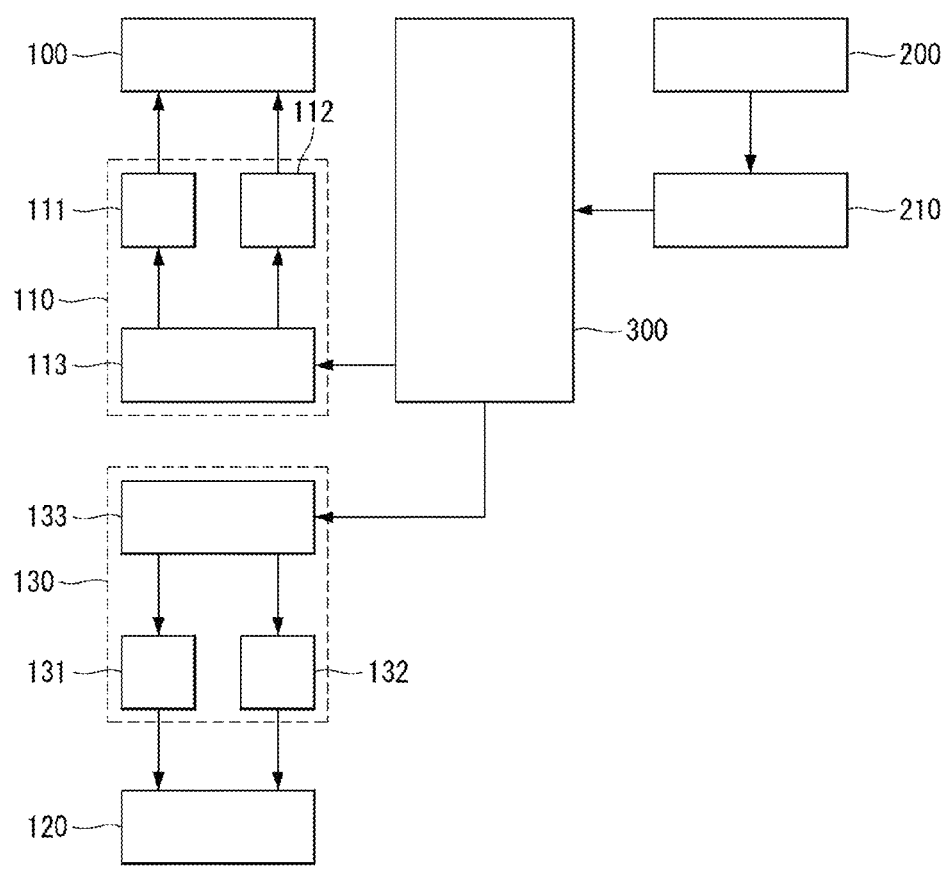
FIG. 8 is a block diagram of the transparent display device of FIG. 7.

FIG. 7 is a perspective view of a transparent display device according to another embodiment of the present invention. FIG. 8 is a block diagram of the transparent display device of FIG. 7. With reference to FIGS. 7 and 8, the transparent display device according to an embodiment of the present invention comprises a first transparent display panel 100, first transparent display panel driver 110, second transparent display panel 120, second transparent display panel driver 130, first gaze detection sensor 200, gaze direction determination unit 210, and controller 300.

Since the first transparent display panel 100, first transparent display panel driver 110, second transparent display panel 120, second transparent display panel driver 130, first gaze detection sensor 200, gaze direction determination unit 210, and controller 300 of the transparent display device according to another embodiment of the present invention shown in FIGS. 7 and 8 are actually the same as those described with reference to FIGS. 1 and 2, detailed descriptions thereof will be omitted.

With reference to FIG. 7, the second transparent display panel 120 can be disposed on the front surface, rear surface, left-side surface, right-side surface, upper surface, or lower surface of the first transparent display panel 100. Though FIG. 7 and FIGS. 10a to 10f assume that the second transparent display panel 120 is disposed being separated from the rear surface of the first transparent display panel 100 by a predetermined distance, it should be noted that the present invention is not limited to the assumption.

The second transparent display panel 120, being implemented with a see-through display, is capable of displaying images. The second transparent display panel 120 can be implemented by a flat panel display device such as Liquid Crystal Display (LCD) or Organic Light Emitting Diode (OLED). Though the embodiment of the present invention below assume that the second transparent display panel 120 is implemented by LCD, it should be noted that the present invention is not limited to the assumption. Meanwhile, in case the second transparent display panel 120 is implemented by LCD, the second transparent display panel 120 can be implemented actually in the same way as the first transparent display panel 100 described with reference to FIGS. 1 and 2; therefore, detailed description thereof will be omitted.

The second transparent display panel driver 130 comprises a second gate driver 131, second data driver 132, and second timing controller 133. Since the second transparent display panel driver 130 can be implemented actually in the same way as the first transparent display panel driver 110 described with reference to FIGS. 1 and 2, detailed descriptions thereof will be omitted.

Figure 9:
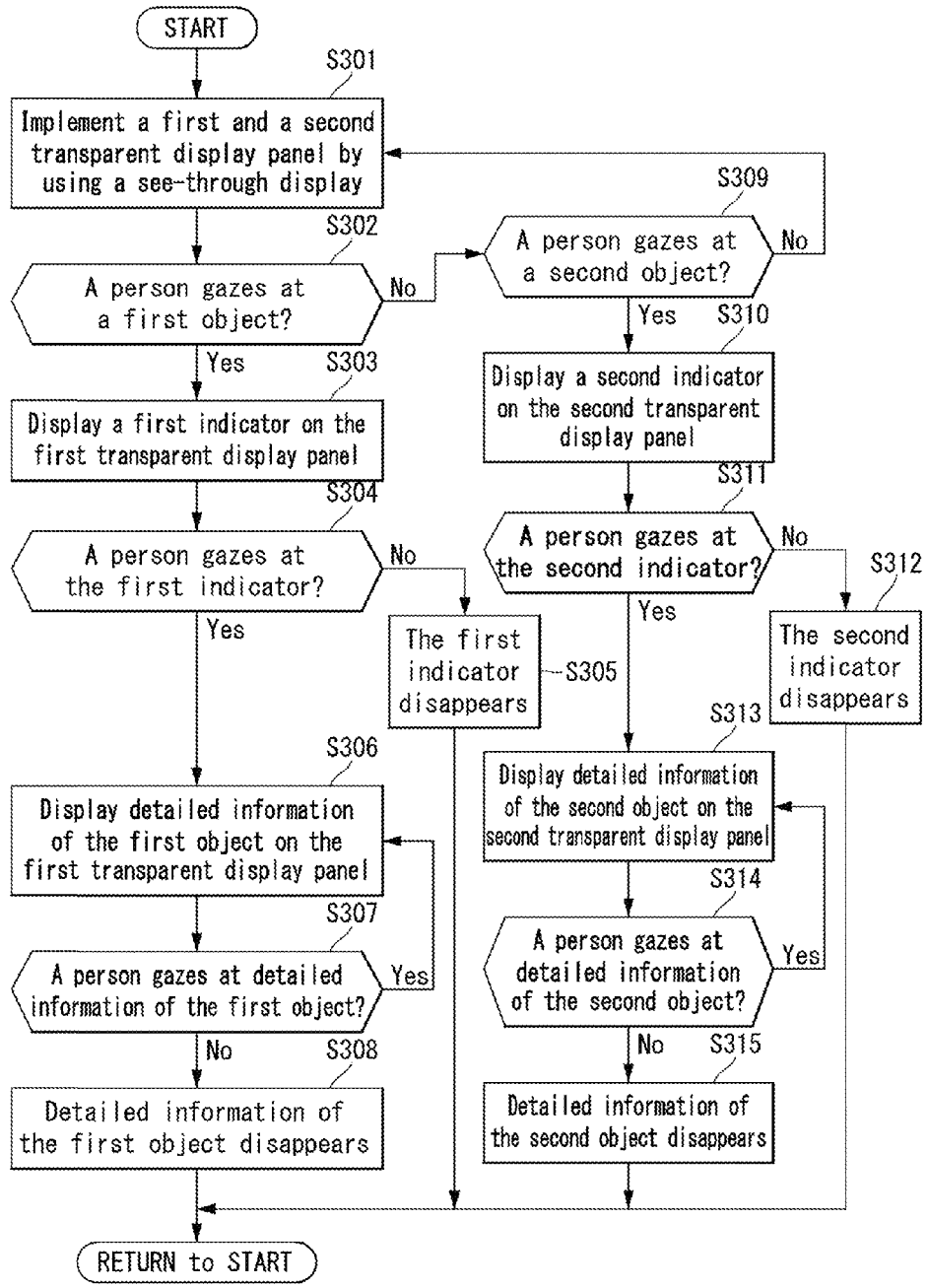
FIG. 9 is a flow diagram illustrating a method for controlling a transparent display device according to a third embodiment of the present invention.

FIG. 9 is a flow diagram illustrating a method for controlling a transparent display device according to a third embodiment of the present invention. FIGS. 10*a* to 10*f* illustrate the transparent display device of FIG. 9 and a person looking at the transparent display device. FIG. 9 and FIGS. 10*a* to 10*f* illustrate a method for controlling a first and a second transparent display panel 100, 120 according to the person's gaze in case the second transparent display panel 120 is disposed being separated from the rear surface of the first transparent display panel 100 by a predetermined distance, a first object (OBJ1) is placed between the first transparent display panel 100 and the second transparent display panel 120, and a second object (OBJ2) is placed on the rear surface of the second transparent display panel 120.

First, the controller 300 transmits digital image data of peak white tone to the first transparent display panel driver 110 and the second transparent display panel driver 130 so that the first and the second transparent display panel 100, 120 can implement a see-through display. As a result, since the first and the second transparent display panel 100, 120 become transparent, a person (PSN) located at the front of the first and the second transparent display panel 100, 120 and looking at the first and the second transparent display panel 100, 120 can see the first and the second object (OBJ1, OBJ2) S301.

Second, the controller 300 determines whether the gaze of the person (PSN) looking at the first 100 and the second transparent display panel 120 is directed to one of the first OBJ1 and the second object OBJ2. More specifically, the first gaze detection sensor 200 generates image data by capturing an image of the person (PSN) looking at the first transparent display panel 100 in front of the first transparent display panel 100 and outputs image data to the gaze direction determination unit 210. In this case, the gaze direction determination unit 210 calculates position coordinates of the person (PSN) by analyzing the image data and calculates the gaze direction of the person (PSN). The controller 300 can determine whether the gaze of the person (PSN) is directed to any one of the first (OBJ1) and the second object (OBJ2) on the basis of the position coordinates of the person (PSN) calculated by the gaze direction determination unit 210, gaze direction of the person (PSN), and position coordinates of each of the first (OBJ1) and the second object (OBJ2) pre-stored in the memory. In case the gaze of the person (PSN) looking at the first transparent display panel 100 is not directed to any one of the first (OBJ1) and the second object (OBJ2), the controller 300 maintains the first transparent display panel 100 to be transparent S302, S309.

Figure 10A:
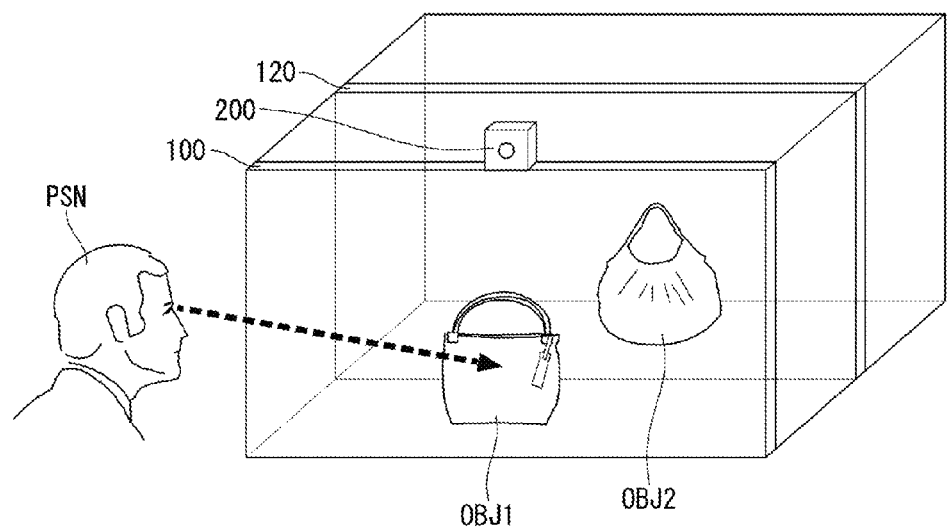
FIGS. 10a to 10f illustrate the transparent display device of FIG. 9 and a person looking at the transparent display device.
Figure 10B:
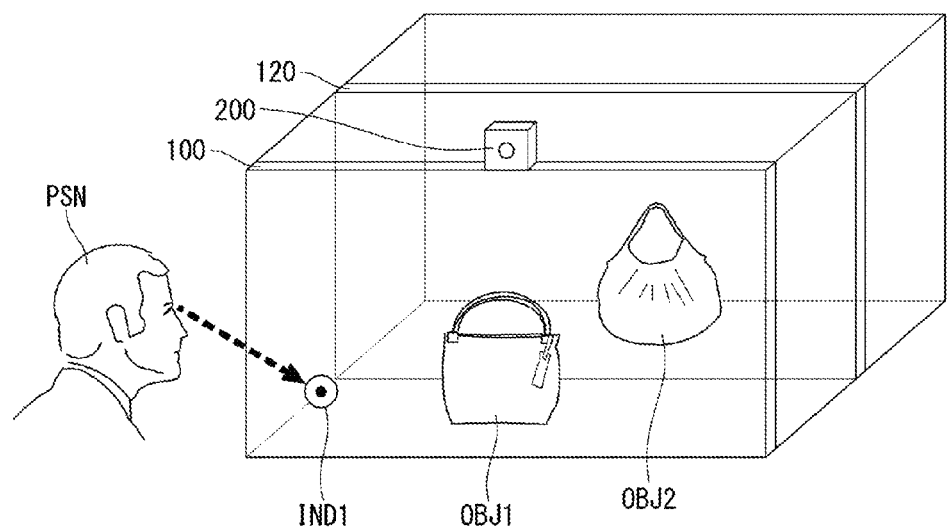

Third, in case the gaze of the person (PSN) is directed to the first object (OBJ1) as shown in FIG. 10*a*, the controller 300 controls the first transparent display panel 100 so that a first indicator (IND1) with respect to the first object (OBJ1) can be displayed on the first transparent display panel 100 as shown in FIG. 10*b*. The first indicator (IND1) is an identification mark to draw the person's attention, where FIG. 10*b* shows a mark of "⊙", but the present invention is not limited to the particular mark. In other words, the first indicator (IND1) can be implemented in any form such as a circle, triangle, or rectangle.

The first indicator (IND1) can be displayed at the front of the first object (OBJ1) on the first transparent display panel 100. Or the display position of the first indicator (IND1) can be adjusted according to the position of the person (PSN) looking at the first object (OBJ1). For example, in case the person (PSN) looking at the first object (OBJ1) is at the left of the first object (OBJ1) as shown in FIG. 10*b*, the first indicator (IND1) can be displayed at the left of the front of the first object (OBJ1) on the first transparent display panel 100. In this case, the person (PSN) looking at the first object (OBJ1) can recognize the first indicator (IND1) more easily S303.

Figure 10C:
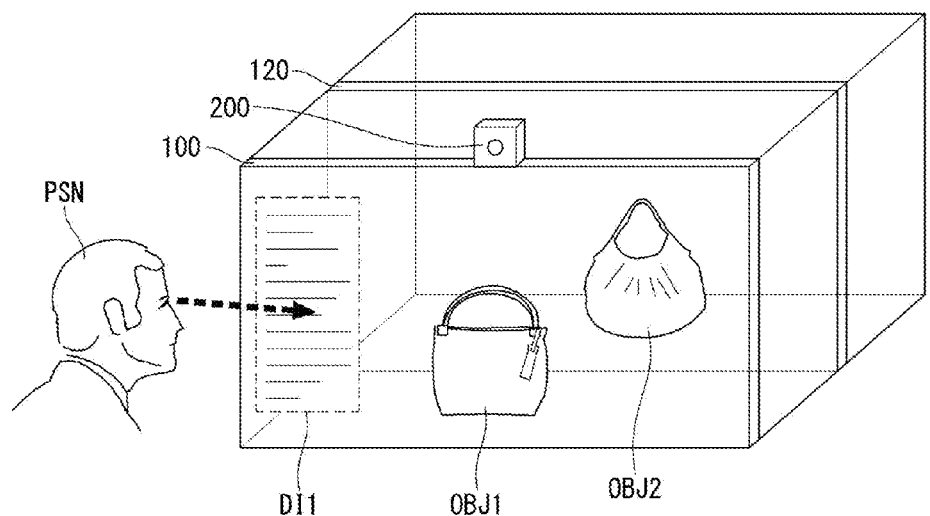

Fourth, the controller 300 determines whether the gaze of the person (PSN) is directed to the first indicator (IND1). In case the gaze of the person (PSN) is not directed to the first indicator (IND1) for a predetermined time period, the controller 300 controls the first indicator (IND1) to disappear from the first transparent display panel 100. Also, as shown in FIG. 10*b*, in case the gaze of the person (PSN) is directed to the first indicator (IND1), the controller 300 controls the first transparent display panel 100 so that detailed information (DI1) of the first object can be displayed on the first transparent display panel 100 as shown in FIG. 10*c*. The detailed information (DI1) of the first object can include any kind of information once it is intended to express the object (OBJ) with more detail, such as a window including text, image, or video.

The detailed information (DI1) of the first object can be displayed at the position where the first indicator (IND1) has been displayed. In other words, the detailed information (DI1) of the first object can be displayed at the front of the first object (OBJ1) in the first transparent display panel 100. Also, the display position of the detailed information (DI1) of the first object can be adjusted according to the position of the person (PSN) looking at the first object (OBJ1). For example, as shown in FIG. 10*c*, in case the person (PSN) looking at the first object (OBJ1) is located at the left of the first object (OBJ1), the detailed information (DI1) of the first object can be displayed at the left of the front of the first object (OBJ1) in the first transparent display panel 100. Similarly, the detailed information (DI1) of the first object can be displayed across the first transparent display panel 100, S304, S305, S306.

Fifth, the controller 300 determines whether the gaze of the person (PSN) is directed to the detailed information (DI1) of the first object. In case the gaze of the person (PSN) is not directed to the detailed information (DI1) of the first object for a predetermined period of time, the controller 300 controls the detailed information (DI1) of the first object to disappear from the first transparent display panel 100. Also, in case the gaze of the person (PSN) is directed to the detailed information (DI1) of the first object, the controller 300 controls the first transparent display panel 100 to maintain the detailed information (DI1) of the first object to be displayed on the first transparent display panel 100, S307, S308.

Figure 10D:
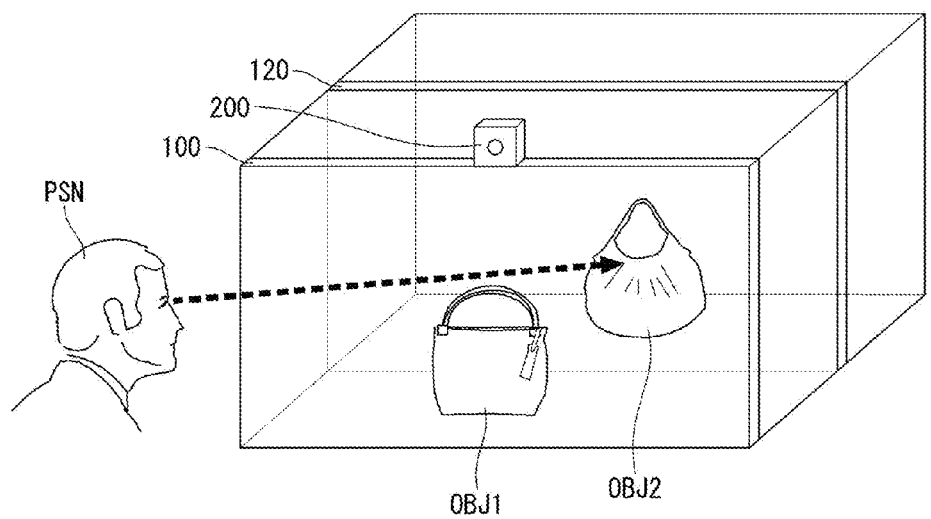
Figure 10E:
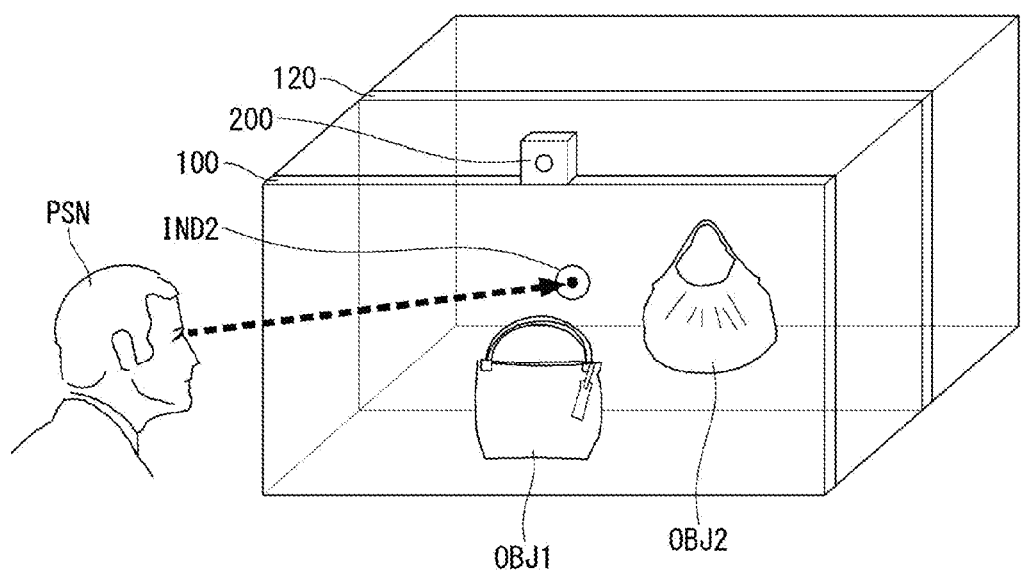

Sixth, in case the gaze of the person (PSN) is directed to the second object (OBJ2) as shown in FIG. 10d, the controller 300 controls the second transparent display panel 120 so that a second indicator (IND2) with respect to the second object (OBJ2) can be displayed on the second transparent display panel 120 as shown in FIG. 10e. The second indicator (IND2) is an identification mark to draw the person's attention, where FIG. 10e shows a mark of "☉", but the present invention is not limited to the particular mark. In other words, the second indicator (IND2) can be implemented in any form such as a circle, triangle, or rectangle.

The second indicator (IND2) can be displayed at the front of the second object (OBJ2) on the second transparent display panel 120. Or the display position of the second indicator (IND2) can be adjusted according to the position of the person (PSN) looking at the second object (OBJ2). For example, in case the person (PSN) looking at the second object (OBJ2) is at the left of the second object (OBJ2) as shown in FIG. 10e, the second indicator (IND2) can be displayed at the left of the front of the second object (OBJ2) on the second transparent display panel 120. In this case, the person (PSN) looking at the second object (OBJ2) can recognize the second indicator (IND2) more easily S310.

Figure 10F:
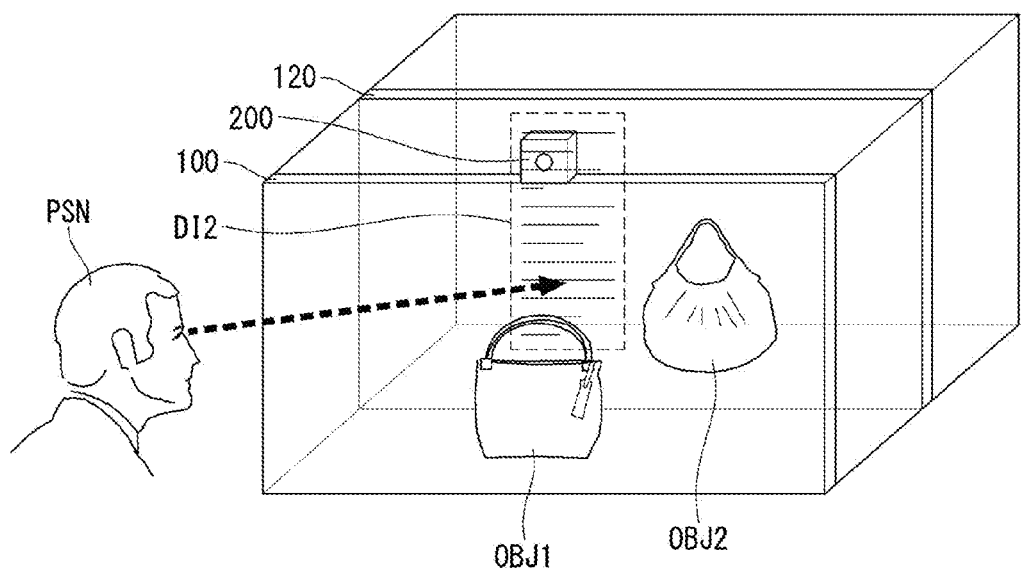

Seventh, the controller 300 determines whether the gaze of the person (PSN) is directed to the second indicator (IND2). In case the gaze of the person (PSN) is not directed to the second indicator (IND2) for a predetermined time period, the controller 300 controls the second indicator (IND2) to disappear from the second transparent display panel 120. Also, as shown in FIG. 10e, in case the gaze of the person (PSN) is directed to the second indicator (IND2), the controller 300 controls the second transparent display panel 120 so that detailed information (DI2) of the second object can be displayed on the second transparent display panel 120 as shown in FIG. 10f. The detailed information (DI2) of the second object can include any kind of information once it is intended to express the second object (OBJ2) with more detail, such as a window including text, image, or video.

The detailed information (DI2) of the second object can be displayed at the position where the second indicator (IND2) has been displayed. In other words, the detailed information (DI2) of the second object can be displayed at the front of the second object (OBJ2) in the second transparent display panel 120. Also, the display position of the detailed information (DI2) of the second object can be adjusted according to the position of the person (PSN) looking at the second object (OBJ2). For example, as shown in FIG. 10f, in case the person (PSN) looking at the second object (OBJ2) is located at the left of the second object (OBJ2), the detailed information (DI2) of the second object can be displayed at the left of the front of the second object (OBJ2) in the second transparent display panel 120. Similarly, the detailed information (DI2) of the second object can be displayed across the second transparent display panel 120, S311, S312, S313.

Eighth, the controller 300 determines whether the gaze of the person (PSN) is directed to the detailed information (DI2) of the second object. In case the gaze of the person (PSN) is not directed to the detailed information (DI2) of the second object for a predetermined time period, the controller 300 controls the detailed information (DI2) of the second object to disappear from the second transparent display panel 120. Also, in case the gaze of the person (PSN) is directed to the detailed information (DI2) of the second object, the controller 300 controls the second transparent display panel 120 so that detailed information (DI2) of the second object can be displayed on the second transparent display panel 120, S314, S315.

Meanwhile, the S303 to S305 steps can be skipped in the third embodiment of the present invention. In this case, if the gaze of the person (PSN) is directed to the first object (OBJ1), the third embodiment of the present invention can display the detailed information (DI1) of the first object directly on the first transparent display panel 100 without using the first indicator (IND1). Also, the S310 to S312 steps can be skipped in the third embodiment of the present invention. In this case, if the gaze of the person (PSN) is directed to the second object (OBJ2), the third embodiment of the present invention can display the detailed information (DI2) of the second object directly on the second transparent display panel 120 without using the second indicator (IND2).

As described above, a method for controlling a transparent display device according to the third embodiment of the present invention determines to which the gaze of the person (PSN) is directed among the first object (OBJ1), the second object (OBJ2), first indicator (IND1), second indicator (IND2), detailed information (DI1) of the first object, and detailed information (DI2) of the second object; and accordingly, displays the first indicator (IND1), second indicator (IND2), detailed information (DI1) of the first object, or detailed information (DI2) of the second object on a part of the first transparent display panel 100 or the second transparent display panel 120. As a result, the third embodiment of the present invention can provide detailed information about the object to the person (PSN) looking at the object by using the transparent display device. In other words, the third embodiment of the present invention can improve service satisfaction for the person (PSN) by utilizing the transparent display device.

Figure 11:
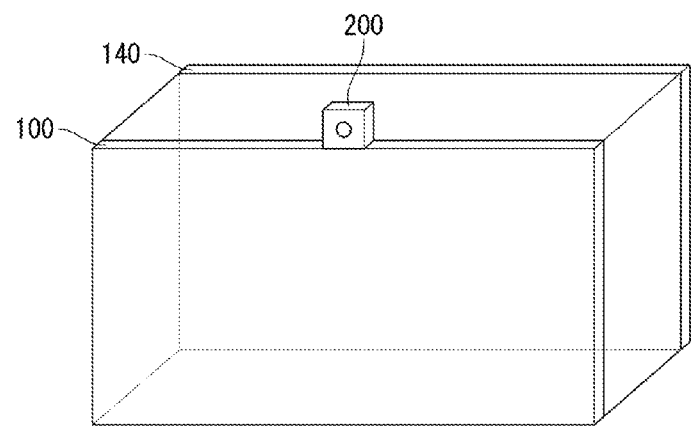
FIG. 11 is a perspective view of a transparent display device according to a yet another embodiment of the present invention.
Figure 12:
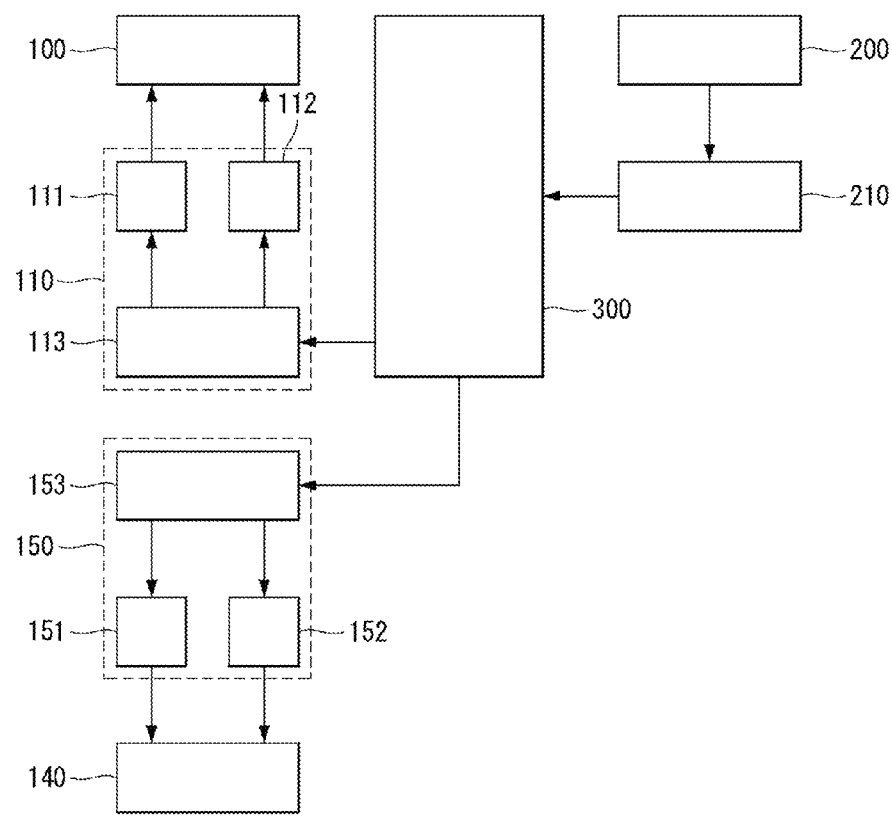
FIG. 12 is a block diagram of the transparent display device of FIG. 11.

FIG. 11 is a perspective view of a transparent display device according to a yet another embodiment of the present invention. FIG. 12 is a block diagram of the transparent display device of FIG. 11. With reference to FIGS. 11 and 12, the transparent display device according to a yet another embodiment of the present invention comprises a first transparent display panel 100, transparent display panel driver 110, mirror display panel 140, mirror display panel driver 150, first gaze detection sensor 200, gaze direction determination unit 210, and controller 300.

Since the first transparent display panel 100, first transparent display panel driver 110, first gaze detection sensor 200, gaze direction determination unit 210, and controller 300 of the transparent display device according to a yet another embodiment of the present invention of FIGS. 11 and 12 are actually the same as those described with reference to FIGS. 1 and 2, detailed descriptions thereof will be omitted.

With reference to FIG. 11, the mirror display panel 140 can be disposed on the rear surface of the first transparent display panel 100. FIG. 11 and FIGS. 14a-14c assume that the mirror display panel 140 is disposed being separated from the rear surface of the first transparent display panel 100 by a predetermined distance.

The mirror display panel 140 includes a second transparent display panel 141 and a mirror 142 as shown in FIG. 11. Like the first transparent display panel 100, the second transparent display panel 141 can not only implement a see-through display but also display an image. Therefore, in case the second transparent display panel 141 is implemented as being transparent, the mirror display panel 140 functions as a mirror. Also, in case the second transparent display panel 141 displays an image, the mirror display panel 140 displays an image.

The second transparent display panel 141 can be implemented by a flat panel display device such as Liquid Crystal Display (LCD) or Organic Light Emitting Diode (OLED). Though the embodiment of the present invention below assume that the second transparent display panel 141 is implemented by LCD, it should be noted that the present invention is not limited to the assumption. Meanwhile, in case the second transparent display panel 141 is implemented by LCD, the second transparent display panel 141 can be implemented actually in the same way as the first transparent display panel 100 described with reference to FIGS. 1 and 2; therefore, detailed description thereof will be omitted.

The mirror display panel driver 150 comprises a second gate driver 131 for driving the second transparent display panel 141, second data driver 132, and second timing controller 133. Since the second transparent display panel driver 130 can be implemented actually in the same way as the first transparent display panel driver described with reference to FIGS. 1 and 2, detailed descriptions thereof will be omitted.

Figure 13:
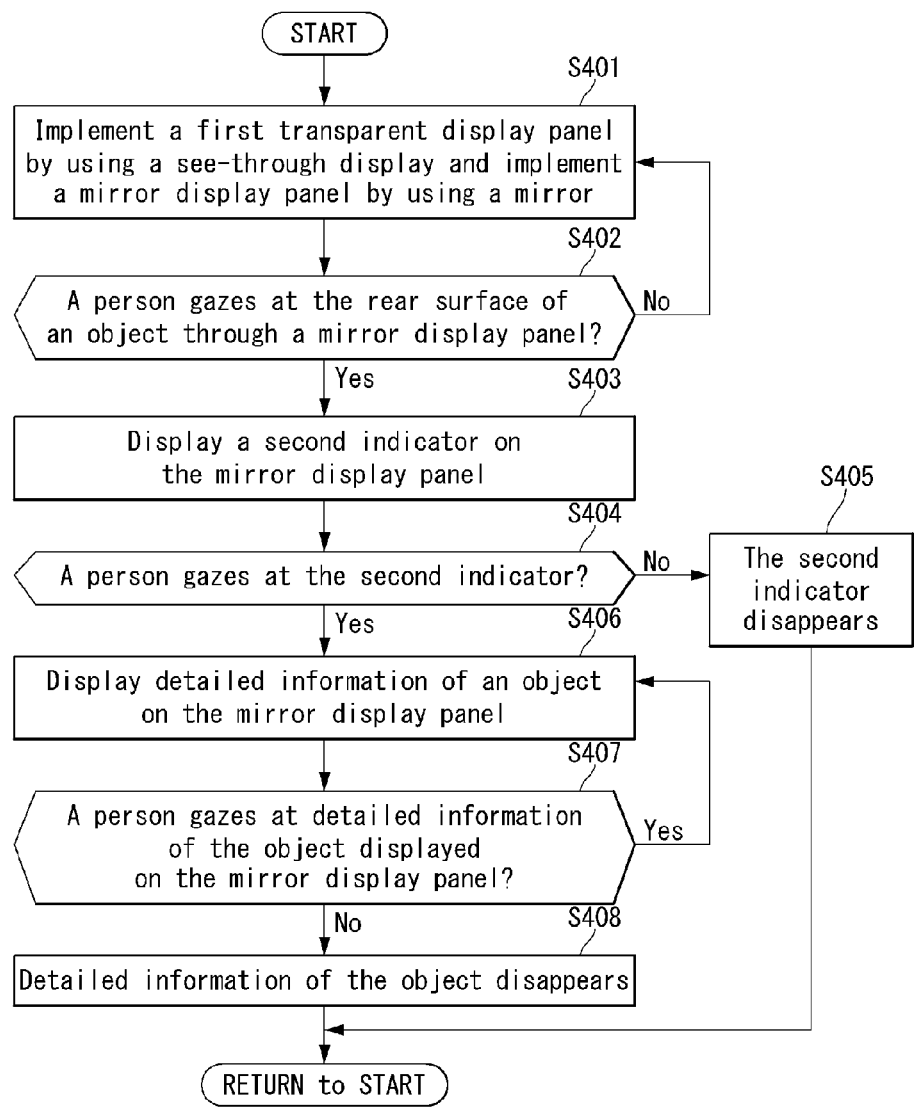
FIG. 13 is a flow diagram illustrating a method for controlling a transparent display device according to a fourth embodiment of the present invention.
Figure 14A:
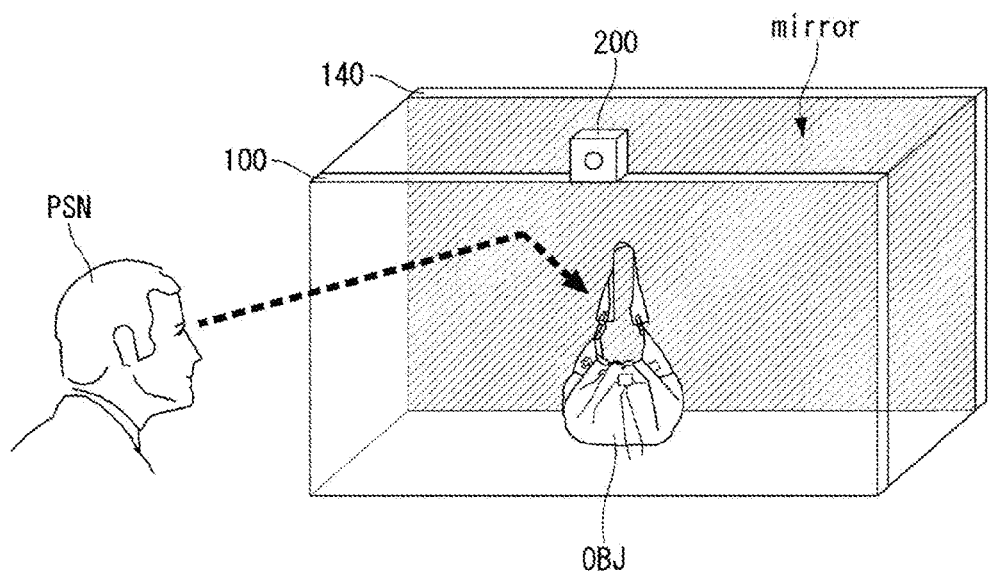
FIGS. 14a-14c illustrate the transparent display device of FIG. 13 and a person looking at the transparent display device.
Figure 14B:
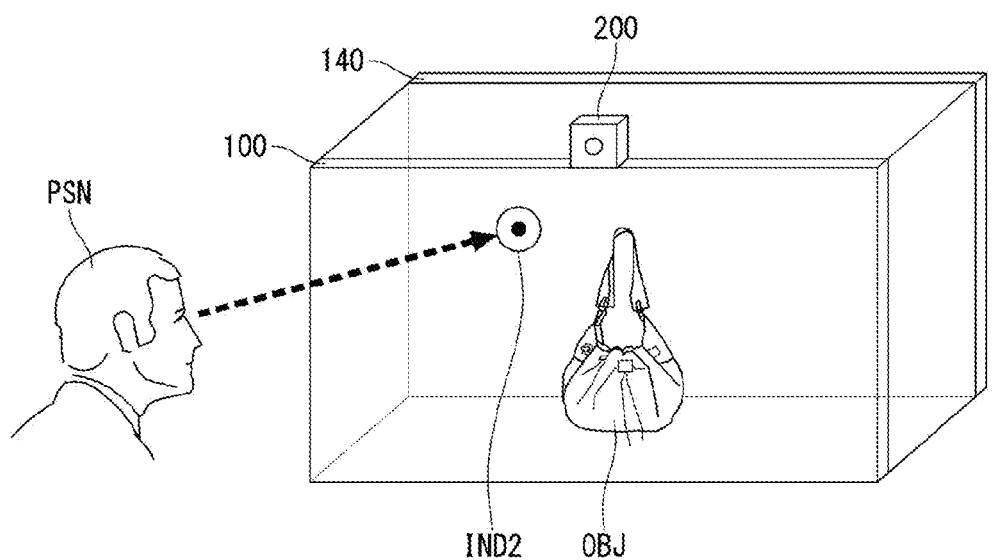
Figure 14C:
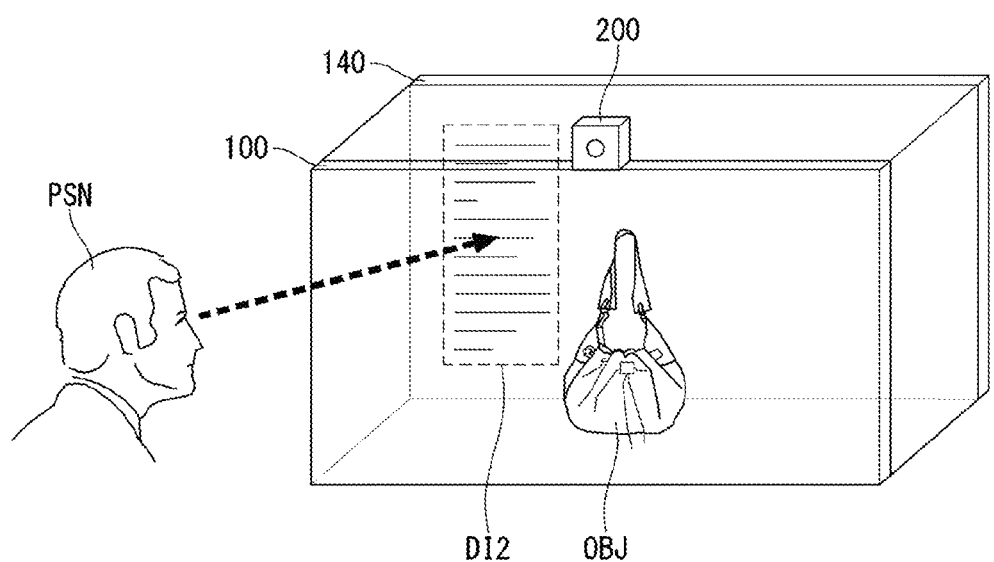

FIG. 13 is a flow diagram illustrating a method for controlling a transparent display device according to a fourth embodiment of the present invention. FIGS. 14a-14c illustrate the transparent display device of FIG. 13 and a person looking at the transparent display device. FIG. 13 and FIGS. 14a-14c illustrate in detail a method for controlling a first transparent display panel 100 and a mirror display panel 140 according to the gaze of a person in case the mirror display panel 140 is disposed being separated from the rear surface of the first transparent display panel 100 by a predetermined distance, and an object (OBJ) is located between the first transparent display panel 100 and the mirror display panel 140.

First, the controller 300 transmits digital image data of peak white tone to the first transparent display panel driver 110 so that the first transparent display panel 100 can implement a see-through display. Also, the controller 300 transmits digital image data of peak white tone to the mirror display panel driver 150 so that the mirror display panel 140 can function as a mirror. As a result, since the first transparent display panel 100 become transparent and the mirror display panel 140 is implemented as a mirror, a person (PSN) can see not only the front surface of the object (OBJ) but also the rear surface of the object (OBJ) through the mirror display panel 140, S401.

Second, the controller 300 determines whether the gaze of the person (PSN) is directed to the front surface or rear surface of the object (OBJ). More specifically, the first gaze detection sensor 200 generates image data by capturing an image of the person (PSN) looking at the first transparent display panel 100 in front of the first transparent display panel 100 and outputs image data to the gaze direction determination unit 210. In this case, the gaze direction determination unit 210 calculates position coordinates of the person (PSN) by analyzing the image data and calculates the gaze direction of the person (PSN). The controller 300 can determine whether the gaze of the person (PSN) is directed to the front surface of the object (OBJ) on the basis of the position coordinates of the person (PSN) calculated by the gaze direction determination unit 210, gaze direction of the person (PSN), and position coordinates of the object (OBJ) pre-stored in the memory or to the rear surface of the object (OBJ) through the mirror display panel 140.

In case the gaze of the person (PSN) is directed to the front surface of the object (OBJ), the controller 300 controls the first transparent display panel 100 and controls the mirror display panel 140 to function as a mirror actually in the same way as described with reference to FIG. 3 and FIGS. 4a to 4c. In other words, the controller 300 controls the first transparent display panel 100 as in the S103 to S108 steps of FIG. 3. Therefore, in case the gaze of the person (PSN) is directed to the front surface of the object (OBJ), a detailed description of a method for controlling the first transparent display panel 100 will be omitted.

Also, in case the gaze of the person (PSN) looking at the first transparent display panel 100 is directed neither to the front surface of the object (OBJ) nor to the rear surface of the object (OBJ) through the mirror display panel 140, the controller 300 maintains the first transparent display panel 100 to be transparent and the mirror display panel 140 to function as a mirror S402.

Third, in case the gaze of the person (PSN) is directed to the rear surface of the object (OBJ) as shown in FIG. 14a, the controller 300 controls the mirror display panel 140 so that a second indicator (IND2) with respect to the OBJ can be displayed as shown in FIG. 14b. The second indicator (IND2) is an identification mark to draw the person's attention, where FIG. 14b shows a mark of "⊙", but the present invention is not limited to the particular mark. In other words, the second indicator (IND2) can be implemented in any form such as a circle, triangle, or rectangle.

In case the gaze of the person (PSN) is directed to the rear surface of the object (OBJ), the second indicator (IND2) can be displayed on a part of the mirror display panel 140 to which the gaze of the person (PSN) is directed as shown in FIG. 14b. In this case, the person (PSN) looking at the rear surface of the object (OBJ) can recognize the second indicator (IND2) more easily S403.

Fourth, the controller 300 determines whether the gaze of the person (PSN) is directed to the second indicator (IND2). In case the gaze of the person (PSN) is not directed to the second indicator (IND2) for a predetermined time period, the controller 300 controls the second indicator (IND2) to disappear from the mirror display panel 140. Also, as shown in FIG. 14b, in case the gaze of the person (PSN) is directed to the second indicator (IND2), the controller 300 controls the mirror display panel 140 so that detailed information (DI) of the object can be displayed on the mirror display panel 140 as shown in FIG. 14c. The detailed information (DI) of the object can include any kind of information once it is intended to express the object (OBJ) with more detail, such as a window including text, image, or video.

The detailed information (DI) of the object displayed on the mirror display panel 140 can be the same as or different from the detailed information (DI) of the object displayed on the first transparent display panel 100. For example, in case the detailed information (DI) of the object displayed on the first transparent display panel 100 is the detailed information about the front surface of the object (OBJ), the detailed information (DI) of the object displayed on the mirror display panel 140 can correspond to the detailed information of the rear surface of the object (OBJ).

Also, the detailed information (DI) of the object can be displayed at the position where the second indicator (IND2) has been displayed. Or the detailed information (DI) of the object can be displayed across the mirror display panel 140, S404, S405, S406.

Fifth, the controller 300 determines whether the gaze of the person (PSN) is directed to the detailed information (DI) of the object displayed on the mirror display panel 140. In case the gaze of the person (PSN) is not directed to the detailed information (DI) of the object displayed on the mirror display panel 140 for a predetermined period of time, the controller 300 controls the detailed information (DI) of the object to disappear from the mirror display panel 140. Also, in case the gaze of the person (PSN) is directed to the detailed information (DI) of the object displayed on the mirror display panel 140, the controller 300 controls the mirror display panel 140 to maintain the detailed information (DI) of the object to be displayed on the mirror display panel 140, S407, S408.

Meanwhile, the S403 to S405 steps in the fourth embodiment of the present invention can be skipped. In this case, if the gaze of the person (PSN) is directed to the rear surface of the object (OBJ), the fourth embodiment of the present invention can display detailed information (DI) of the object directly on the mirror display panel 140 without using the second indicator (IND2).

As described above, a method for controlling a transparent display device according to the fourth embodiment of the present invention determines to which the gaze of the person (PSN) is directed among the object (OBJ), the indicator, and detailed information (DI) of the object; and accordingly, displays the indicator or detailed information (DI) of the object on a part of the first transparent display panel 100 or the mirror display panel 140. As a result, the fourth embodiment of the present invention can provide detailed information about the object to the person (PSN) looking at the object by using the transparent display device. In other words, the fourth embodiment of the present invention can improve service satisfaction for the person (PSN) by utilizing the transparent display device.

Figure 15:
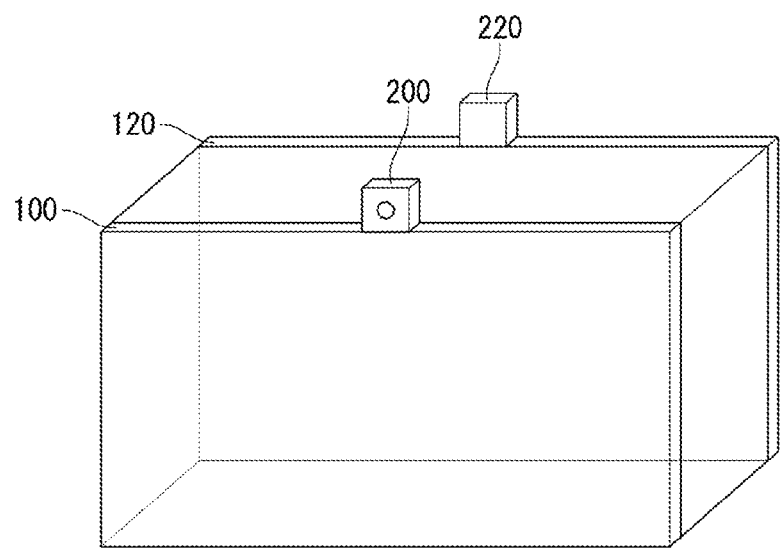
FIG. 15 is a perspective view of a transparent display device according to a still another embodiment of the present invention.
Figure 16:
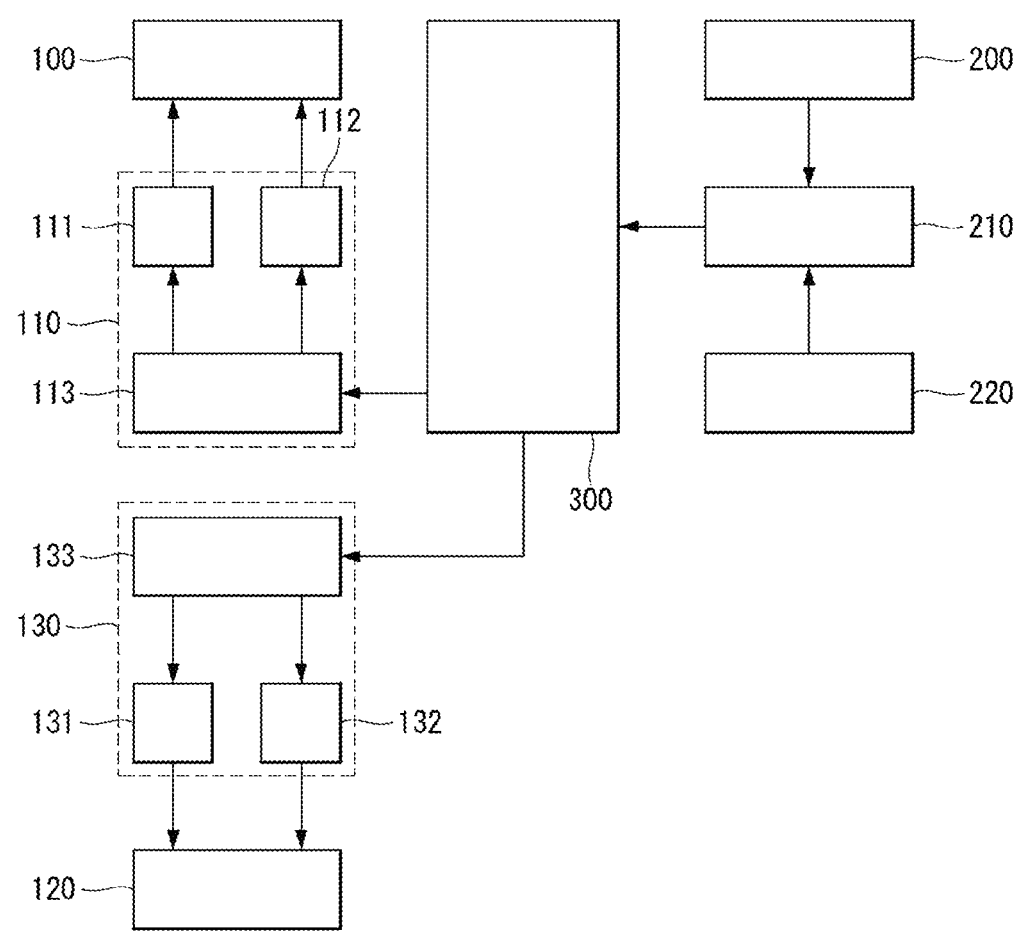
FIG. 16 is a block diagram of the transparent display device of FIG. 15.

FIG. 15 is a perspective view of a transparent display device according to a still another embodiment of the present invention. FIG. 16 is a block diagram of the transparent display device of FIG. 15. With reference to FIGS. 15 and 16, a transparent display device according to a still another embodiment of the present invention comprises a first transparent display panel 100, first transparent display panel driver 110, second transparent display panel 120, second transparent display panel driver 130, first gaze detection sensor 200, second gaze detection sensor 220, gaze direction determination unit 210, and controller 300.

Since the first transparent display panel 100, first transparent display panel driver 110, first gaze detection sensor 200, gaze direction determination unit 210, and controller 300 of the transparent display device according to a still another embodiment of the present invention of FIGS. 15 and 16 are actually the same as those described with reference to FIGS. 1 and 2, detailed descriptions thereof will be omitted.

With reference to FIG. 15, the second transparent display panel 120 can be disposed on the rear surface of the first transparent display panel 100. The second transparent display panel 120 is disposed being separated from the rear surface of the first transparent display panel 100 by a predetermined distance. The front surface of the second transparent display panel 120 faces the opposite direction of the front surface of the first transparent display panel 100.

The second gaze detection sensor 220 detects the gaze of the person looking at the second transparent display panel 200 in front of the second transparent display panel 120. The second gaze detection sensor 220 can be disposed on the upper surface of the second transparent display panel 120 as shown in FIG. 15. Since the front surface of the second transparent display panel 120 faces the opposite direction to which the front surface of the first transparent display panel 100 is directed, the second gaze detection sensor 220 also faces the opposite direction to which the first gaze detection sensor 200 is directed. Therefore, if the first gaze detection sensor 200 is used for detecting the gaze of the person at the front of the first transparent display panel 100, the second gaze detection sensor 220 is used for detecting the gaze of the person located in the rear of the first transparent display panel 100.

The second gaze detection sensor 220 can be implemented by a CCD camera sensor or a CMOS camera sensor. In this case, the second gaze detection sensor 220 generates image data by capturing an image of the person in the front of the second transparent display panel 120 and looking at the second transparent display panel 120 and outputs the image data to the gaze direction determination unit 210.

Like the first transparent display panel 100, the second transparent display panel 120 can not only implement a see-through display but also display an image. The second transparent display panel 120 can be implemented by a flat panel display device such as Liquid Crystal Display (LCD) or Organic Light Emitting Diode (OLED). Though the embodiment of the present invention below assume that the second transparent display panel 120 is implemented by LCD, it should be noted that the present invention is not limited to the assumption. Meanwhile, in case the second transparent display panel 120 is implemented by LCD, the second transparent display panel 120 can be implemented actually in the same way as the first transparent display panel 100 described with reference to FIGS. 1 and 2; therefore, detailed description thereof will be omitted.

The second transparent display panel driver 130 comprises a second gate driver 131, second data driver 132, and second timing controller 133. Since the second transparent display panel driver 130 can be implemented actually in the same way as the first transparent display panel driver 110 described with reference to FIGS. 1 and 2, detailed descriptions thereof will be omitted.

Figure 17:
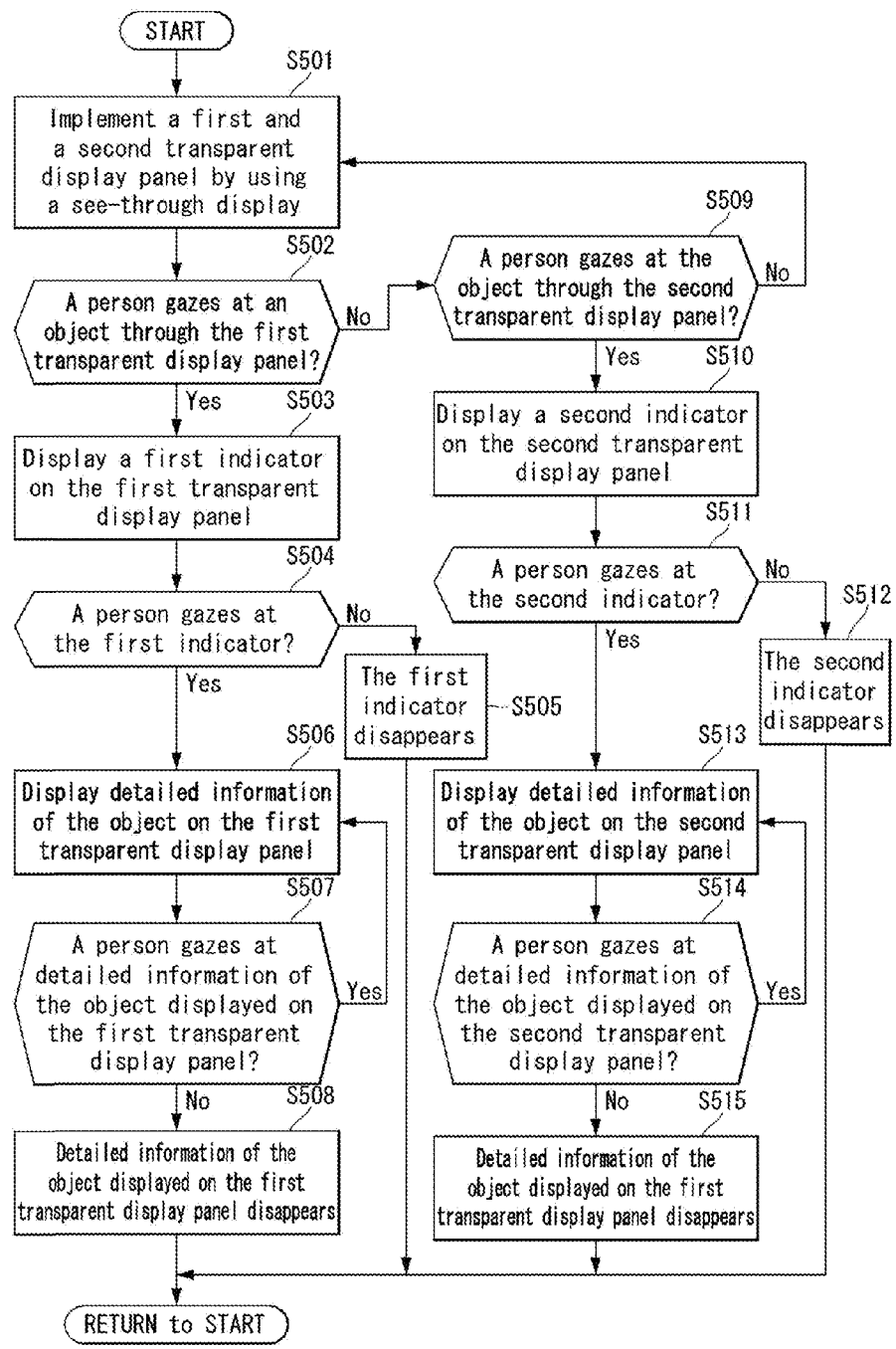
FIG. 17 is a flow diagram illustrating a method for controlling a transparent display device according to a fifth embodiment of the present invention.

FIG. 17 is a flow diagram illustrating a method for controlling a transparent display device according to a fifth embodiment of the present invention. FIGS. 18*a* to 18*f* illustrate the transparent display device of FIG. 17 and a person looking at the transparent display device. FIG. 17 and FIGS. 18*a* to 18*f* illustrate in detail a method for controlling a first and a second transparent display panel 100, 120 according to the gaze of the person for the case where the second transparent display panel 120 is disposed being separated from the rear surface of the first transparent display panel 100, the front surface of the second transparent display panel 100 faces the opposite direction to which the front surface of the first transparent display panel 100 is directed, and an object (OBJ) is located between the first transparent display panel 100 and the second transparent display panel 120.

First, the controller 300 transmits digital image data of peak white tone to the first transparent display panel driver 110 and the second transparent display panel driver 130 so that the first and the second transparent display panel 100, 120 can implement a see-through display. As a result, since the first and the second transparent display panel 100, 120 become transparent, a person (PSN) can see the object (OBJ) through the first 100 or the second transparent display panel 120, S501.

Second, the controller 300 determines whether the gaze of the person (PSN) is directed to the object OBJ. More specifically, the first gaze detection sensor 200 generates image data by capturing an image of the person (PSN) looking at the first transparent display panel 100 in front of the first transparent display panel 100 and outputs image data to the gaze direction determination unit 210. In this case, the gaze direction determination unit 210 calculates position coordinates of the person (PSN) by analyzing the image data and calculates the gaze direction of the person (PSN). The controller 300 can determine whether the gaze of the person (PSN) is directed to the object (OBJ) on the basis of the position coordinates of the person (PSN) calculated by the gaze direction determination unit 210, gaze direction of the person (PSN), and position coordinate of the object (OBJ) pre-stored in the memory S502.

Figure 18A:
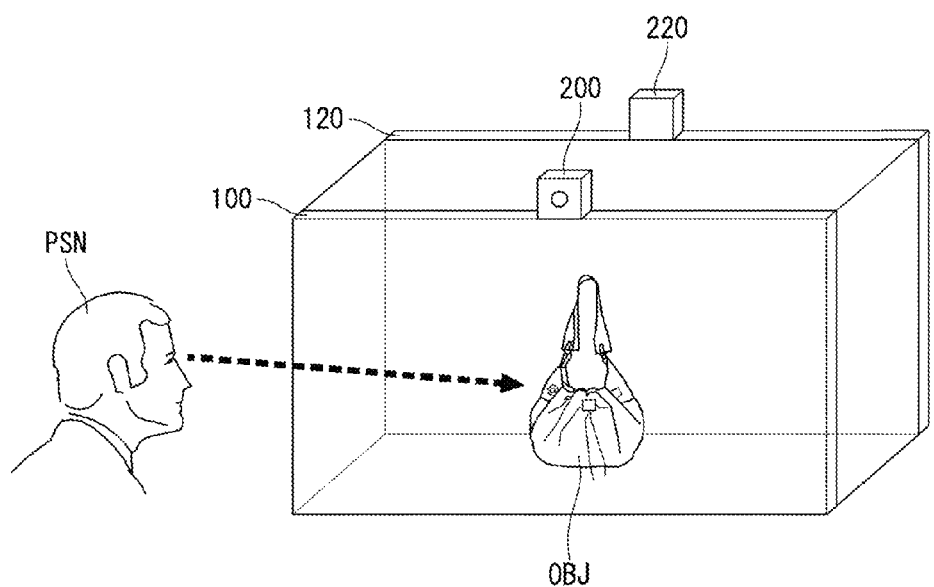
FIGS. 18a to 18f illustrate the transparent display device of FIG. 17 and a person looking at the transparent display device.
Figure 18B:
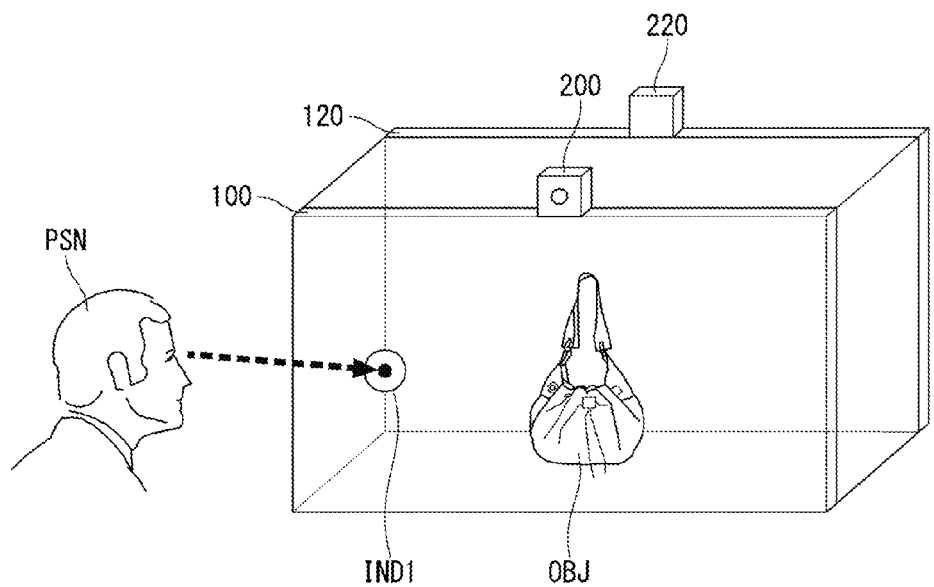

Third, in case the gaze of the person (PSN) is directed to the object (OBJ) as shown in FIG. 18a, the controller 300 controls the first transparent display panel 100 so that a first indicator (IND1) with respect to the object (OBJ) can be displayed on the first transparent display panel 100 as shown in FIG. 18b. The first indicator (IND1) is an identification mark to draw the person's attention, where FIG. 18b shows a mark of "⊙", but the present invention is not limited to the particular mark. In other words, the first indicator (IND1) can be implemented in any form such as a circle, triangle, or rectangle.

The first indicator (IND1) can be displayed at the front of the object (OBJ) on the first transparent display panel 100. Or the display position of the first indicator (IND1) can be adjusted according to the position of the person (PSN) looking at the object (OBJ). For example, in case the person (PSN) looking at the object (OBJ) is at the left of the object (OBJ) as shown in FIG. 18b, the first indicator (IND1) can be displayed at the left of the front of the object (OBJ) on the first transparent display panel 100. In this case, the person (PSN) looking at the object (OBJ) can recognize the first indicator (IND1) more easily S503.

Figure 18C:
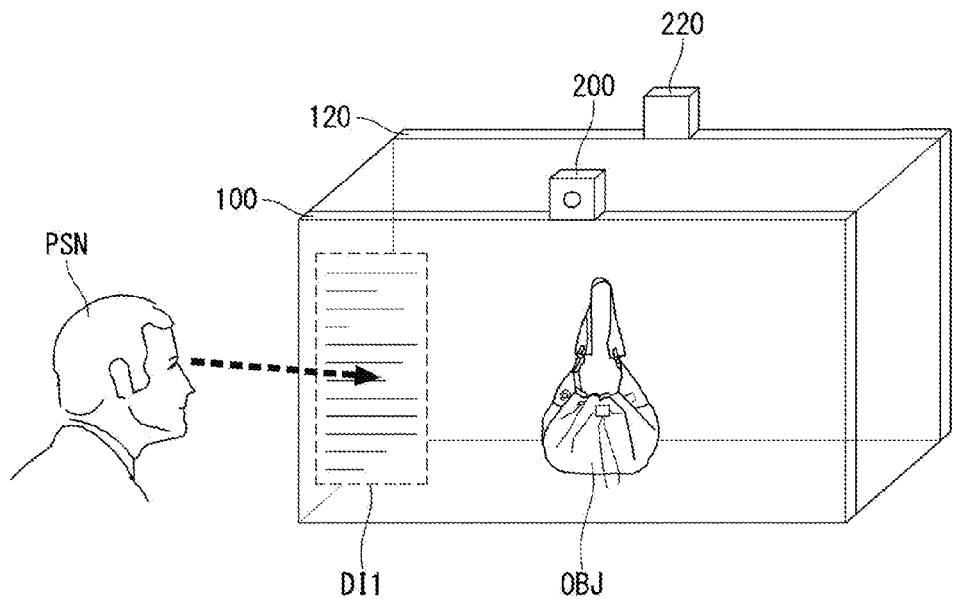

Fourth, the controller 300 determines whether the gaze of the person (PSN) is directed to the first indicator (IND1). In case the gaze of the person (PSN) is not directed to the first indicator (IND1) for a predetermined time period, the controller 300 controls the first indicator (IND1) to disappear from the first transparent display panel 100. Also, as shown in FIG. 18b, in case the gaze of the person (PSN) is directed to the first indicator (IND1), the controller 300 controls the first transparent display panel 100 so that detailed information (DI1) of the object can be displayed on the first transparent display panel 100 as shown in FIG. 18c. The detailed information (DI1) of the object can include any kind of information once it is intended to express the object (OBJ) with more detail, such as a window including text, image, or video.

The detailed information (DI1) of the object displayed on the first transparent display panel 100 can be displayed at the position where the first indicator (IND1) has been displayed. In other words, the detailed information (DI1) of the object displayed on the first transparent display panel 100 can be displayed at the front of the object (OBJ) in the first transparent display panel 100. Also, the display position of the detailed information (DI1) of the object displayed on the first transparent display panel 100 can be adjusted according to the position of the person (PSN) looking at the object (OBJ). For example, as shown in FIG. 18c, in case the person (PSN) looking at the object (OBJ) is located at the left of the object (OBJ), the detailed information (DI1) of the object displayed on the first transparent display panel 100 can be displayed at the left of the front of the object (OBJ) in the first transparent display panel 100. Similarly, the detailed information (DI1) of the object displayed on the first transparent display panel 100 can be displayed across the first transparent display panel 100, S504, S505, S506.

Fifth, the controller 300 determines whether the gaze of the person (PSN) is directed to the detailed information (DI1) of the object displayed on the first transparent display panel 100. In case the gaze of the person (PSN) is not directed to the detailed information (DI1) of the object for a predetermined period of time, the controller 300 controls the detailed information (DI1) of the object to disappear from the first transparent display panel 100. Also, in case the gaze of the person (PSN) is directed to the detailed information (DI1) of the object displayed on the first transparent display panel 100, the controller 300 controls the first transparent display panel 100 to maintain the detailed information (DI1) of the object to be displayed on the first transparent display panel 100, S507, S508.

Sixth, the controller 300 determines whether the gaze of the person (PSN) is directed to the object (OBJ) through the second transparent display panel 100. More specifically, the second gaze detection sensor 220 can generate image data by capturing the image of the person (PSN) looking at the second transparent display panel 120 at the front of the second transparent display panel 120 and output the image data to the gaze direction determination unit 210. In this case, the gaze direction determination unit 210 can calculate the position coordinates of the person (PSN) by analyzing the image data and calculate the gaze direction of the person (PSN). The controller 300 can determine whether the gaze of the person (PSN) is directed to the object through the second transparent display panel 120 on the basis of the position coordinates of the person (PSN) calculated by the gaze direction determination unit 210, gaze direction of the person (PSN), and position coordinates of the object (OBJ) pre-stored in the memory S509.

Figure 18D:
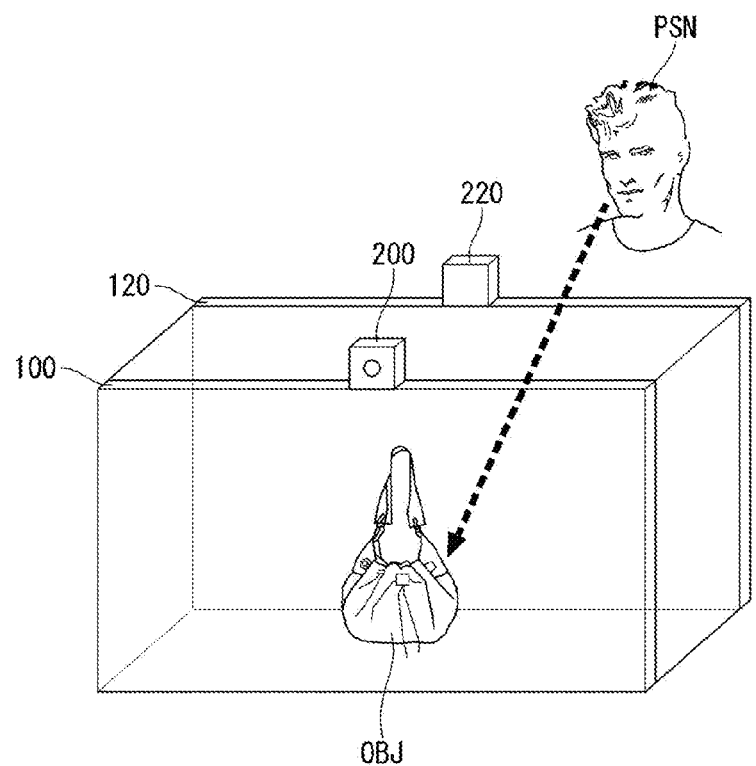
Figure 18E:
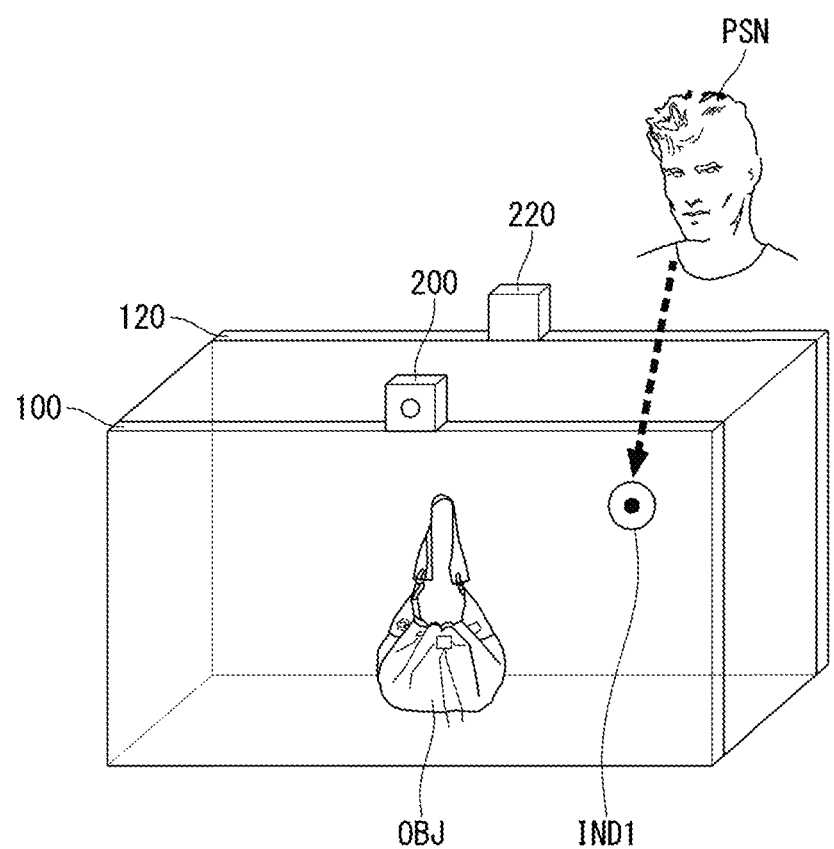

Seventh, in case the gaze of the person (PSN) is directed to the object (OBJ) through the second transparent display panel 120 as shown in FIG. 18d, the controller 300 controls the second transparent display panel 120 so that a second indicator (IND2) with respect to the object (OBJ) can be displayed on the second transparent display panel 120 as shown in FIG. 18e. The second indicator (IND2) is an identification mark to draw the person's attention, where FIG. 18e shows a mark of "⊙", but the present invention is not limited to the particular mark. In other words, the second indicator (IND2) can be implemented in any form such as a circle, triangle, or rectangle.

The second indicator (IND2) can be displayed at the front of the object (OBJ) on the second transparent display panel 120. Or the display position of the second indicator (IND2) can be adjusted according to the position of the person (PSN) looking at the object (OBJ). For example, in case the person (PSN) looking at the object (OBJ) is at the right of the object (OBJ) as shown in FIG. 18e, the second indicator (IND2) can be displayed at the right of the front of the object (OBJ) on the second transparent display panel 120. In this case, the person (PSN) looking at the object (OBJ) can recognize the second indicator (IND2) more easily S510.

Figure 18F:
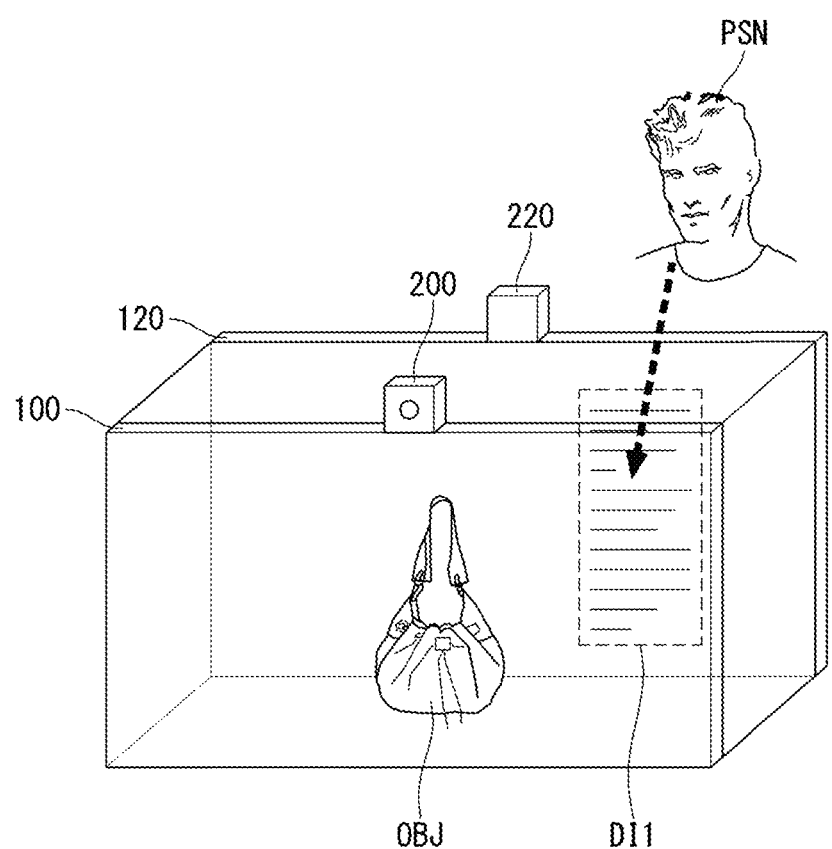

Eighth, the controller 300 determines whether the gaze of the person (PSN) is directed to the second indicator (IND2). In case the gaze of the person (PSN) is not directed to the second indicator (IND2) for a predetermined time period, the controller 300 controls the second indicator (IND2) to disappear from the second transparent display panel 120. Also, as shown in FIG. 18e, in case the gaze of the person (PSN) is directed to the second indicator (IND2), the controller 300 controls the second transparent display panel 120 so that detailed information (DI1) of the object can be displayed on the second transparent display panel 120 as shown in FIG. 18f. The detailed information (DI1) of the object displayed on the second transparent display panel 120 can include any kind of information once it is intended to express the object (OBJ) with more detail, such as a window including text, image, or video.

The detailed information (DI1) of the object displayed on the second transparent display panel 120 can be displayed at the position where the second indicator (IND2) has been displayed. In other words, the detailed information (DI1) of the object can be displayed at the front of the object (OBJ) in the second transparent display panel 120. Also, the display position of the detailed information (DI1) of the object can be adjusted according to the position of the person (PSN) looking at the object (OBJ). For example, as shown in FIG. 18f, in case the person (PSN) looking at the object (OBJ) is located at the left of the object (OBJ), the detailed information (DI1) of the object can be displayed at the left of the front of the object (OBJ) in the second transparent display panel 120. Similarly, the detailed information (DI1) of the object can be displayed across the second transparent display panel 120, S511, S512, S513.

Ninth, the controller 300 determines whether the gaze of the person (PSN) is directed to the detailed information (DI1) of the object displayed on the second transparent display panel 120. In case the gaze of the person (PSN) is not directed to the detailed information (DI1) of the object displayed on the second transparent display panel 120 for a predetermined time period, the controller 300 controls the detailed information (DI1) of the object to disappear from the second transparent display panel 120. Also, in case the gaze of the person (PSN) is directed to the detailed information (DI1) of the object displayed on the second transparent display panel 120, the controller 300 controls the second transparent display panel 120 so that detailed information (DI1) of the object can be displayed on the second transparent display panel 120, S514, S515.

Meanwhile, the S503 to S505 steps can be skipped in the fifth embodiment of the present invention. In this case, if the gaze of the person (PSN) is directed to the object (OBJ) through the first transparent display panel 100, the fifth embodiment of the present invention can display the detailed information (DI1) of the object directly on the first transparent display panel 100 without using the first indicator (IND1). Also, the S510 to S512 steps can be skipped in the fifth embodiment of the present invention. In this case, if the gaze of the person (PSN) is directed to the object (OBJ) through the second transparent display panel 120, the fifth embodiment of the present invention can display the detailed information (DI1) of the object directly on the second transparent display panel 120 without using the second indicator (IND2).

As described above, a method for controlling a transparent display device according to the fifth embodiment of the present invention determines to which the gaze of the person (PSN) is directed among the object (OBJ), first indicator (IND1), second indicator (IND2), and detailed information (DI) of the object; and accordingly, displays the first indicator (IND1), second indicator (IND2), or detailed information of the object on a part of the first transparent display panel 100 or the second transparent display panel 120. As a result, the fifth embodiment of the present invention can provide detailed information about the object to the person (PSN) looking at the object by using the transparent display device. In other words, the fifth embodiment of the present invention can improve service satisfaction for the person (PSN) by utilizing the transparent display device.

It should be understood by those skilled in the art through the descriptions above that various modifications and changes of the present invention can be made without departing from the technical principles of the present invention. Therefore, the technical scope of the present invention should not be limited by the detailed descriptions of this document, but should be defined by the appended claims.

INDUSTRIAL APPLICABILITY

The present invention can be applied to the industry related to transparent display device.

The invention claimed is:

1. A transparent display device, comprising:
   a first transparent display panel being implemented by a see-through display and displaying an image;
   a first gaze detection sensor detecting gaze of a person looking at the first transparent display panel; and
   a controller configured to:
   analyze the gaze of the person to determine whether the gaze of the person is directed toward an object located behind a rear surface of the first transparent display panel;
   cause the first transparent display panel to display an indicator corresponding to the object when the person's gaze is directed to the object;
   cause the first transparent display panel to stop the displaying of the indicator when the person's gaze is not directed to the indicator for a first threshold time period;
   cause the first transparent display panel to display detailed information of the object when the person's gaze is directed to the indicator; and
   cause the first transparent display panel to stop the displaying of the detailed information of the object when the person's gaze is not directed to the detailed information of the object for a second threshold time period.

2. The device of claim 1, wherein the controller is further configured to cause the first transparent display panel to:
   stop the displaying of the indicator when the person's gaze is directed to the indicator; and
   display the detailed information of the object at a position where the indicator was previously displayed such that the indicator is replaced by the detailed information of the object on the first transparent display panel.

3. The device of claim 1, wherein, the controller is further configured to cause the first transparent display panel to display the indicator or the detailed information of the object at a variable position of the first transparent display panel based on a position of the person looking at the object such that:
   the indicator or the detailed information of the object is displayed at a first position of the first transparent display panel when the person is at a first position; and
   the indicator or the detailed information of the object is displayed at a second position of the first transparent display panel when the person is at a second position.

4. The device of claim 1, wherein, when the person's gaze is directed to any one of a plurality of objects located behind the rear surface of the first transparent display panel, the controller is further configured to cause the first transparent display panel to display:
   a first indicator corresponding to a first object to which the person's gaze is directed; and
   a second indicator guiding the person's gaze to a second object related to the first object.

5. The device of claim 4, wherein, the first and second indicators are displayed at different positions on the first transparent display panel, and the controller is further configured to cause the first transparent display panel to display:
  detailed information of the first object when the person's gaze is directed to the first indicator; and,
  detailed information of the second object when the person's gaze is directed to the second indicator.

6. The device of claim 5, wherein, when the person's gaze is not directed to the first indicator, the second indicator, the detailed information of the first object, or the detailed information of the second object for a third threshold time period, the controller is further configured to cause the first transparent display panel to stop the displaying of the first indicator, the second indicator, the detailed information of the first object, or the detailed information of the second object.

7. The device of claim 1, further comprising a second transparent display panel disposed at an opposite side of a front surface, a rear surface, a left-side surface, a right-side surface, an upper surface, or a lower surface of the first transparent display panel, the second transparent display panel implemented by a see-through display and displaying an image.

8. The device of claim 7, wherein the controller is further configured to:
  cause the first transparent display panel to display a first indicator corresponding to a first object when the person's gaze is directed to the first object located behind the rear surface of the first transparent display panel; and
  cause the second transparent display panel to display a second indicator corresponding to a second object when the person's gaze is directed to the second object located behind a rear surface of the second transparent display panel.

9. The device of claim 8, wherein the controller is further configured to:
  cause the first transparent display panel to display detailed information of the first object when the person's gaze is directed to the first indicator displayed on the first transparent display panel; and
  cause the second transparent display panel to display detailed information of the second object when the person's gaze is directed to the second indicator displayed on the second transparent display panel.

10. The device of claim 9, wherein the controller is further configured to:
  cause the first transparent display panel to stop displaying the first indicator or detailed information of the first object when the person's gaze is not directed to the first indicator or detailed information of the first object for a fourth threshold time period; and
  cause the second transparent display panel to stop displaying the second indicator or detailed information of the second object when the person's gaze is not directed to the second indicator or detailed information of the second object for a fifth threshold time period.

11. The device of claim 1, further comprising a mirror display panel disposed behind the rear surface of the first transparent display panel such that the object is positioned between the first transparent display panel and the mirror display panel, the mirror display panel implemented by a see-through display and displaying an image.

12. The device of claim 11, wherein the controller is further configured to:
  cause the first transparent display panel to display a first indicator corresponding to object when the person's gaze is directed to front of the object through the first transparent display panel; and
  cause the mirror display panel to display a second indicator corresponding to object when the person's gaze is directed to a rear surface of the object through the mirror display panel.

13. The device of claim 12, wherein the controller is further configured to:
  cause the first transparent display panel to display detailed information of the object when the person's gaze is directed to the first indicator displayed on the first transparent display panel; and
  cause the mirror display panel to display detailed information of the object when the person's gaze is directed to the second indicator displayed on the mirror display panel.

14. The device of claim 13, wherein the controller is further configured to:
  cause the first transparent display panel to stop displaying the first indicator or detailed information when the person's gaze is not directed to the first indicator or detailed information of the object displayed on the first transparent display panel for a sixth threshold time period; and
  cause the mirror display panel to stop displaying the second indicator or detailed information of the object when the person's gaze is not directed to the second indicator or detailed information of the object displayed on the mirror display panel for a seventh threshold time period.

15. The device of claim 1, further comprising:
  a second transparent display panel disposed behind the rear surface of the first transparent display panel, the second transparent display panel implemented by a see-through display, and displaying an image; and
  a second gaze detection sensor detecting a gaze direction of a person looking at the second transparent display panel.

16. The device of claim 15, wherein the controller is further configured to:
  cause the first transparent display panel to display a first indicator corresponding to the object when the person's gaze is directed to the object through the first transparent display panel; and
  cause the second transparent display panel to display a second indicator corresponding to the object when the person's gaze is directed to the object through the second transparent display panel.

17. The device of claim 16, wherein the controller is further configured to:
  cause the first transparent display panel to display detailed information of the object when the person's gaze is directed to the first indicator displayed on the first transparent display panel; and
  cause the second transparent display panel to display detailed information of the object when the person's gaze is directed to the second indicator displayed on the second transparent display panel.

18. The device of claim 17, wherein the controller is further configured to:
  cause the first transparent display panel to stop displaying the first indicator or detailed information of the object when the person's gaze is not directed to the first indicator or detailed information of the object displayed on the first transparent display panel for an eighth threshold time period; and cause the second transparent display panel to stop displaying the second indicator or detailed information of the object when the person's gaze is not directed to the second indicator or detailed information of the object displayed on the second transparent display panel for a ninth threshold time period.

19. The device of claim 1, further comprising a gaze direction determination unit calculating position coordinates of a person and gaze direction of the person by analyzing a gaze direction of the person detected by the first gaze detection sensor, wherein the controller is further configured to determine to which direction the person's gaze is directed based on the position coordinates of the person and gaze direction of the person.

20. A method for controlling a transparent display device comprising a first transparent display panel being implemented by a see-through display and displaying an image, the method comprising:
   detecting gaze of a person looking at the first transparent display panel by a first gaze detection sensor;
   analyzing the gaze of the person to determine whether the gaze of the person is directed toward an object located behind a rear surface of the first transparent display panel;
   displaying an indicator corresponding to the object on the first transparent display panel when the person's gaze is directed to the object;
   causing the first transparent display panel to stop the displaying of the indicator when the person's gaze is not directed to the indicator for a first threshold time period;
   displaying detailed information of the object on the first transparent display panel when the person's gaze is directed to the indicator; and
   causing the first transparent display panel to stop the displaying of the detailed information of the object when the person's gaze is not directed to the detailed information of the object for a second threshold time period.

21. The method of claim 20, further comprising:
   when the person's gaze is directed to any one of a plurality of objects located behind the rear surface of the first transparent display panel, displaying a first indicator corresponding to a first object to which the person's gaze is directed on the first transparent display panel, and at the same time, displaying on the first transparent display panel a second indicator guiding the person's gaze to a second object related to the first object;
   when the person's gaze is directed to the first indicator, displaying detailed information of the first object on the first transparent display panel, and when the person's gaze is directed to the second indicator, displaying detailed information of the second object on the first transparent display panel; and
   when the person's gaze is not directed to the first indicator, the second indicator, the detailed information of the first object, or the detailed information of the second object for a third threshold time period, causing the first transparent display panel to stop displaying the first indicator, the second indicator, the detailed information of the first object, or the detailed information of the second object.

22. The method of claim 20, wherein the transparent display device further comprises a second transparent display panel disposed at an opposite side of a front surface, a rear surface, a left-side surface, a right-side surface, an upper surface, or a lower surface of the first transparent display panel, the second transparent display panel implemented by a see-through display, and displaying an image, and
   wherein the method further comprises:
   when the person's gaze is directed to a first object disposed behind the rear surface of the first transparent display panel, displaying a first indicator corresponding to the first object on the first transparent display panel, and when the person's gaze is directed to a second object disposed behind a rear surface of the second transparent display panel, displaying a second indicator corresponding to the second object on the second transparent display panel;
   when the person's gaze is directed to the first indicator displayed on the first transparent display panel, displaying detailed information of the first object on the first transparent display panel and when the person's gaze is directed to the second indicator displayed on the second transparent display panel, displaying detailed information of the second object on the second transparent display panel; and
   when the person's gaze is not directed to the first indicator or detailed information of the first object for a fourth threshold time period, causing the first transparent display panel to stop displaying the first indicator or detailed information of the first object, and when the person's gaze is not directed to the second indicator or detailed information of the second object for a fifth threshold time period, causing the second transparent display panel to stop displaying the second indicator or detailed information of the second object.

23. The method of claim 20, wherein the transparent display device further comprises a mirror display panel implemented by a mirror and displaying an image, and
   wherein the method further comprises:
   when the person's gaze is directed to front of the object through the first transparent display panel, displaying a first indicator corresponding to the object on the first transparent display panel, and when the person's gaze is directed to a rear surface of the object through the mirror display panel, displaying a second indicator corresponding to the object on the mirror display panel;
   when the person's gaze is directed to the first indicator, displaying detailed information of the object on the first transparent a display panel, and when the person's gaze is directed to the second indicator, displaying detailed information of the object on the mirror display panel;
   when the person's gaze is not directed to the first indicator or detailed information of an object displayed on the first transparent display panel for a sixth threshold time period, causing the first transparent display panel to stop displaying the first indicator or detailed information of the object; and
   when the person's gaze is not directed to the second indicator or detailed information of the object displayed on the mirror display panel for a seventh threshold time period, causing the mirror display panel to stop displaying the second indicator or detailed information of the second object.

24. The method of claim 20, wherein the transparent display device further comprises:
   a second transparent display panel disposed behind the rear surface of the first transparent display panel, the second transparent display panel implemented by a see-through display, and displaying an image; and a second gaze detection sensor detecting a gaze direction of a person looking at the second transparent display panel, and wherein the the method further comprises:

when the person's gaze is directed to the object through the first transparent display panel, displaying a first indicator corresponding to the object on the first transparent display panel, and when the person's gaze is directed to the object through the second transparent display panel, displaying a second indicator corresponding to the object on the second transparent display panel;

when the person's gaze is directed to the first indicator, displaying detailed information of the object on the first transparent display panel, and when the person's gaze is directed to the second indicator, displaying detailed information of the object on the second transparent display panel;

when the person's gaze is not directed to the first indicator or detailed information of the object displayed on the first transparent display panel for a eighth threshold time period, causing the first transparent display panel to stop displaying the first indicator or detailed information of the object; and when the person's gaze is not directed to the second indicator or detailed information of the object displayed on the second transparent display panel for a ninth threshold time period, causing the second transparent display panel to stop displaying the second indicator or detailed information of the object.

\* \* \* \* \*